United States Patent [19]

Schultz et al.

[11] Patent Number: 5,679,943

[45] Date of Patent: Oct. 21, 1997

[54] HAND-HELD TERMINAL WITH DISPLAY SCREENS, INTERACTIVE SCREENS, MAGNETIC CREDIT CARD READERS, SCANNERS, PRINTERS AND HANDLERS

[75] Inventors: Darald R. Schultz; Steven E. Koenck, both of Cedar Rapids; Jon Rasmussen, Mt. Vernon; John K. Rohde, Cedar Rapids, all of Iowa

[73] Assignee: Norand Corporation, Cedar Rapids, Iowa

[21] Appl. No.: 471,904

[22] Filed: Jun. 7, 1995

Related U.S. Application Data

[63] Continuation of Ser. No. 163,917, Dec. 8, 1993, abandoned, which is a continuation-in-part of Ser. No. 957,048, Oct. 5, 1992, abandoned, which is a continuation-in-part of Ser. No. 927,167, Aug. 5, 1992, abandoned, which is a continuation-in-part of Ser. No. 878,866, May 5, 1992, abandoned, which is a continuation-in-part of Ser. No. 818,762, Jan. 10, 1992, abandoned, which is a continuation-in-part of Ser. No. 816,888, Jan. 3, 1992, abandoned, which is a continuation-in-part of Ser. No. 809,380, Dec. 18, 1991, abandoned, and Ser. No. 633,500, Dec. 26, 1990, Pat. No. 5,202,817, which is a continuation-in-part of Ser. No. 626,711, Dec. 12, 1990, abandoned, Ser. No. 364,594, Jun. 7, 1989, abandoned, Ser. No. 364,902, Jun. 8, 1989, abandoned, and Ser. No. 660,615, Feb. 25, 1991, Pat. No. 5,218,187, which is a continuation-in-part of PCT/US90/03028, Jun. 7, 1990, published as WO90/16033, Dec. 27, 1990 and a continuation-in-part of Ser. No. 467,096, Jan. 18, 1990, Pat. No. 5,052,020, Ser. No. 674,756, Mar. 25, 1991, abandoned, and Ser. No. 816,705, Jan. 2, 1992, abandoned, which is a continuation-in-part of Ser. No. 812,767, Dec. 23, 1991, abandoned, Ser. No. 777,393, Jan. 7, 1992, Pat. No. 5,410,141, and Ser. No. 818,761, Jan. 10, 1992, abandoned, which is a continuation-in-part of Ser. No. 727,021, Jul. 8, 1991, Pat. No. 5,202,825, which is a division of Ser. No. 345,145, Apr. 28, 1989, Pat. No. 5,031,098.

[51] Int. Cl.[6] .................................................. G06F 7/10
[52] U.S. Cl. .............................................. 235/472; 235/462
[58] Field of Search ..................................... 235/472, 462

[56] References Cited

U.S. PATENT DOCUMENTS

| | | | |
|---|---|---|---|
| 4,795,892 | 1/1989 | Gilmore | 235/381 |
| 4,916,441 | 4/1990 | Gombrich | 235/472 |
| 4,947,028 | 8/1990 | Gorog | 235/472 |
| 4,970,379 | 11/1990 | Danstrom . | |
| 5,023,438 | 6/1991 | Wakatsuki . | |
| 5,047,615 | 9/1991 | Fukumoto et al. . | |
| 5,055,660 | 10/1991 | Bertagna et al. . | |
| 5,065,003 | 11/1991 | Wakatsuki et al. . | |
| 5,126,543 | 6/1992 | Bergeron et al. . | |
| 5,142,131 | 8/1992 | Collins . | |
| 5,221,838 | 6/1993 | Gutman | 235/472 |
| 5,250,790 | 10/1993 | Melitsky et al. . | |
| 5,294,782 | 3/1994 | Kumar | 235/472 |
| 5,371,348 | 12/1994 | Kumar | 235/472 |
| 5,386,106 | 1/1995 | Kumar | 235/472 |
| 5,418,684 | 5/1995 | Koenck et al. . | |
| 5,448,046 | 9/1995 | Swartz | 235/462 |

*Primary Examiner*—Harold Pitts
*Attorney, Agent, or Firm*—Simmons, Perrine, Albright & Ellwood, P.L.C.

[57] ABSTRACT

A hand-held terminal for receiving, storing and transmitting information is disclosed. The terminal has a keyboard, a display and is powered by internal, rechargeable batteries. An internal battery charging circuit includes a fixed voltage power supply which is controlled to provide a constant current charging current. A low-power radio frequency transceiver, for example, of a spread spectrum technology (SST) device is provided for receiving and transmitting information between the terminal and a base radio transceiver. A modular, magnetic credit card reader is operably and removably attached to the terminal and is interchangeable with a scanner of the type which can read bar codes or the like. Modules display screens, processor/memory modules, modular keyboards, and operating handles are also shown. A modular, compact printer can also be attached to the hand held terminal. Interactive pen based display screens can be used to allow information to be input directly on the screen.

15 Claims, 27 Drawing Sheets

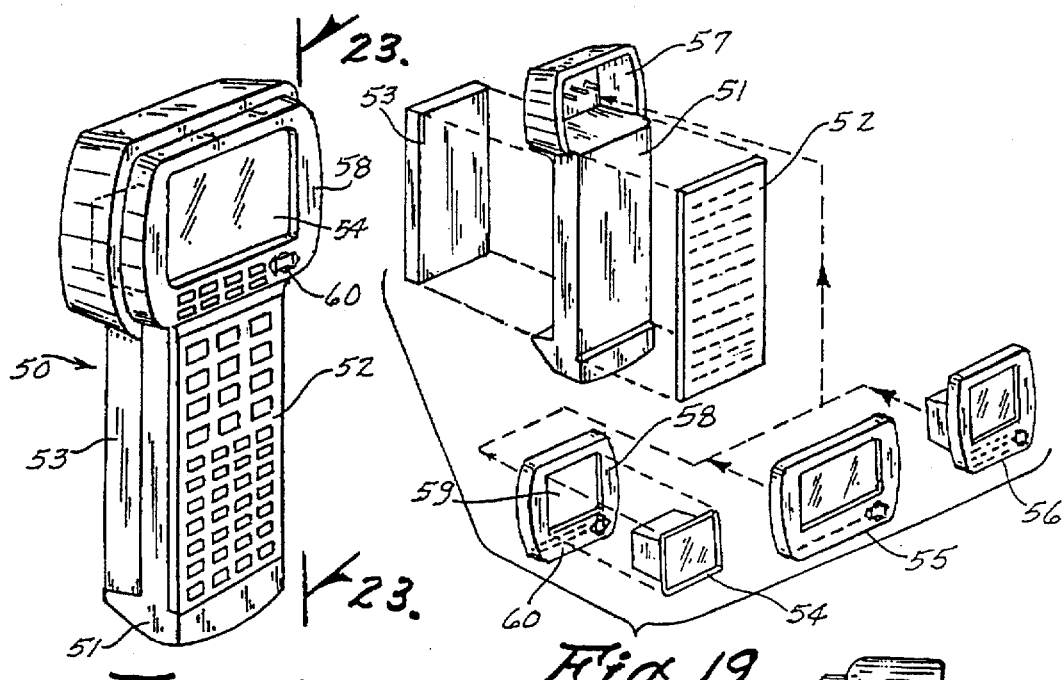
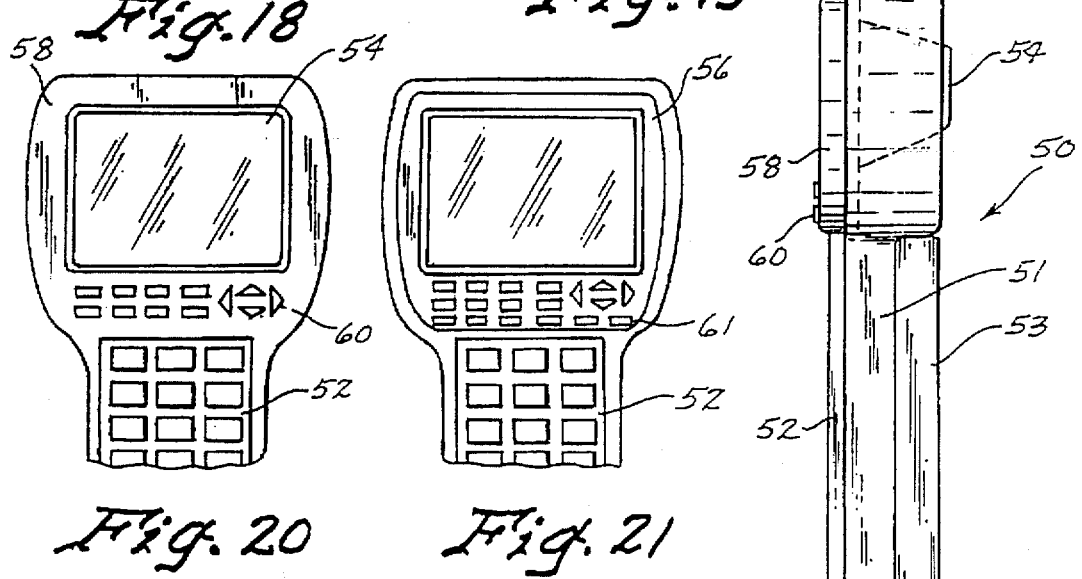
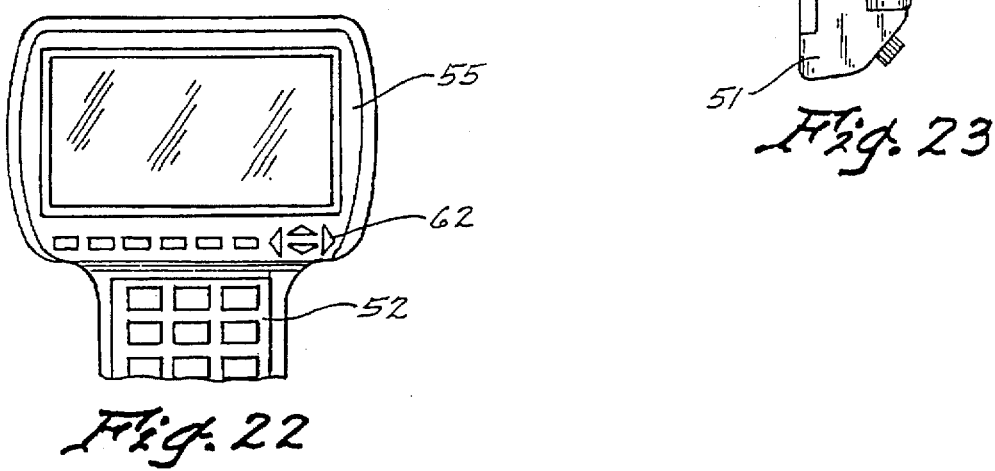

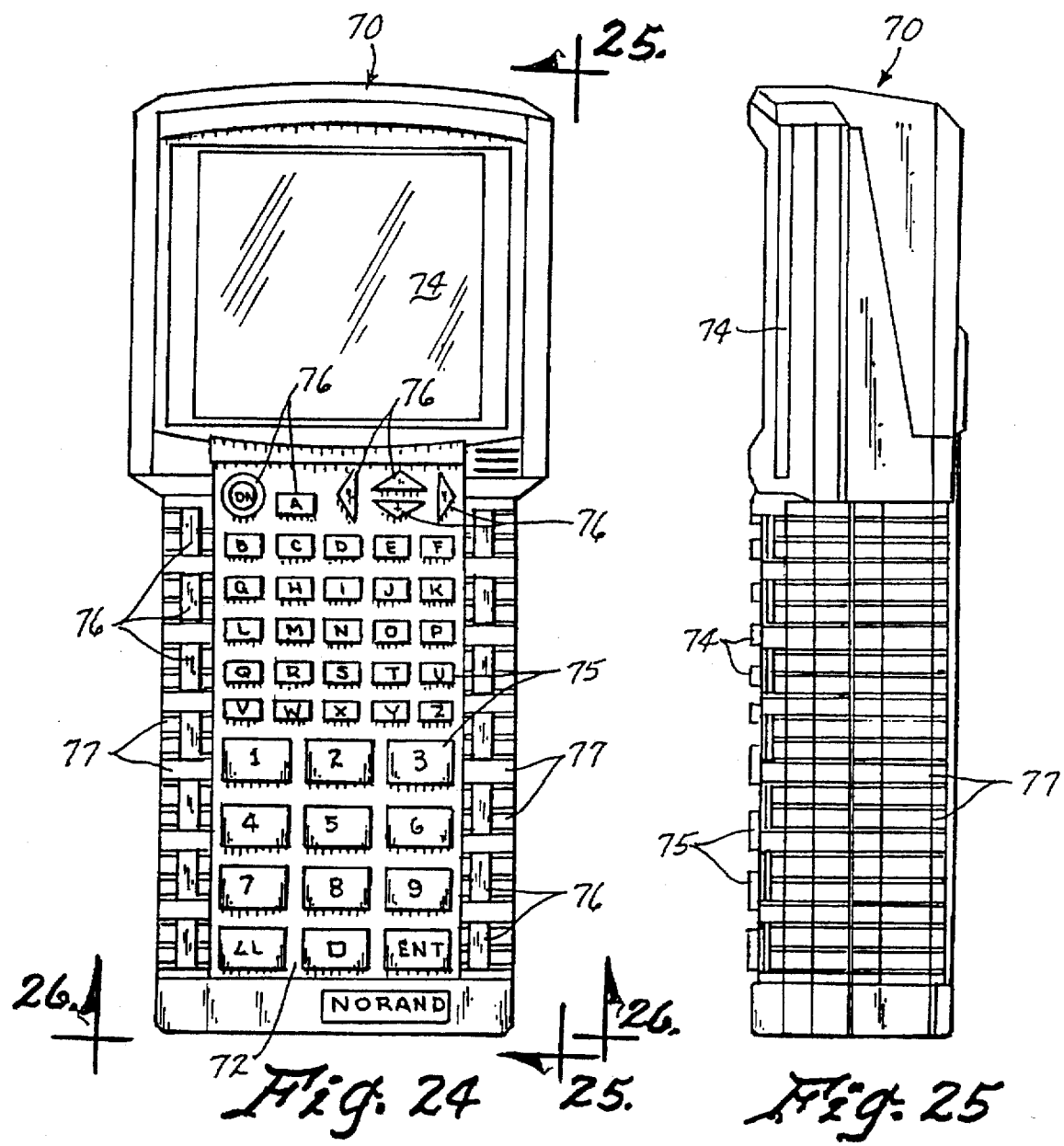
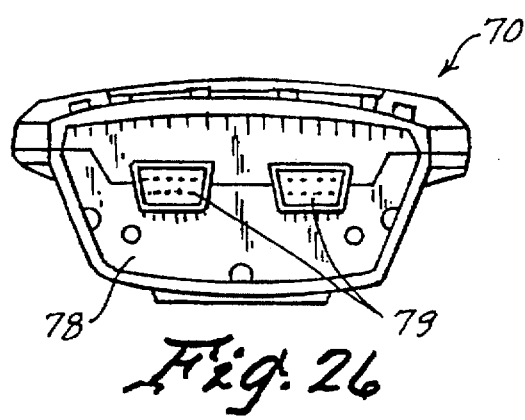
Fig. 24  Fig. 25
Fig. 26

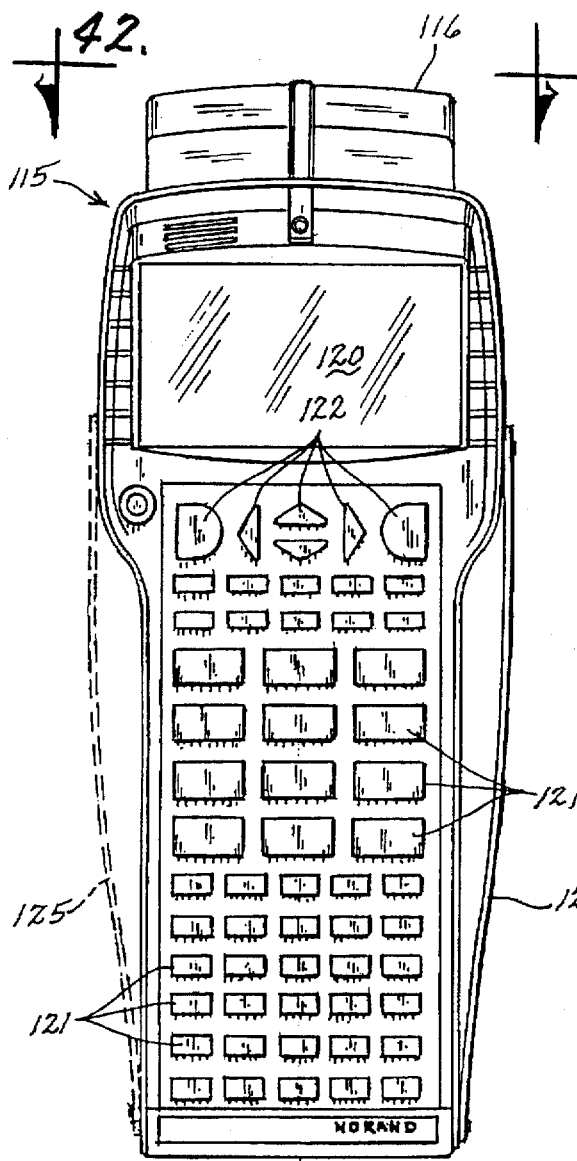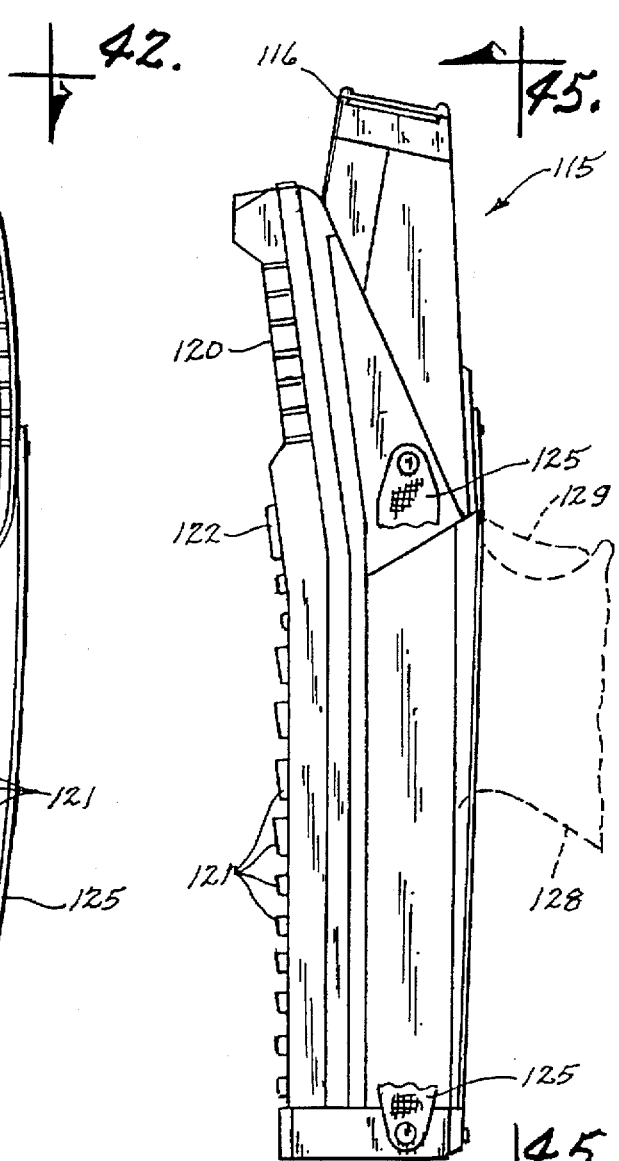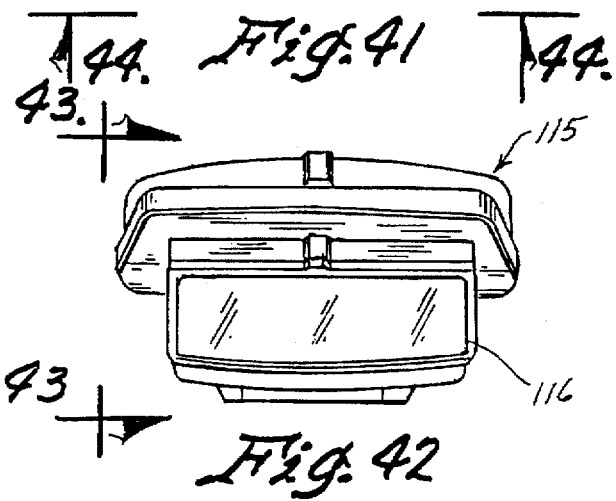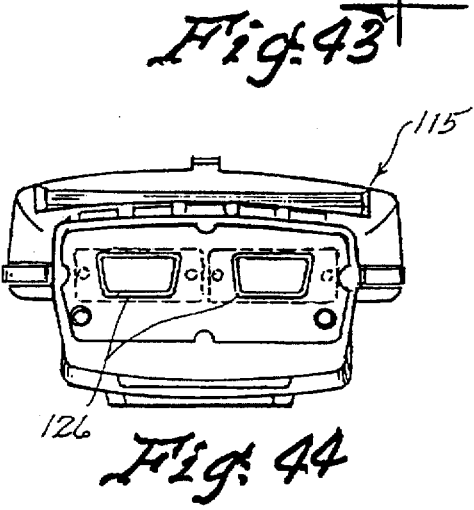

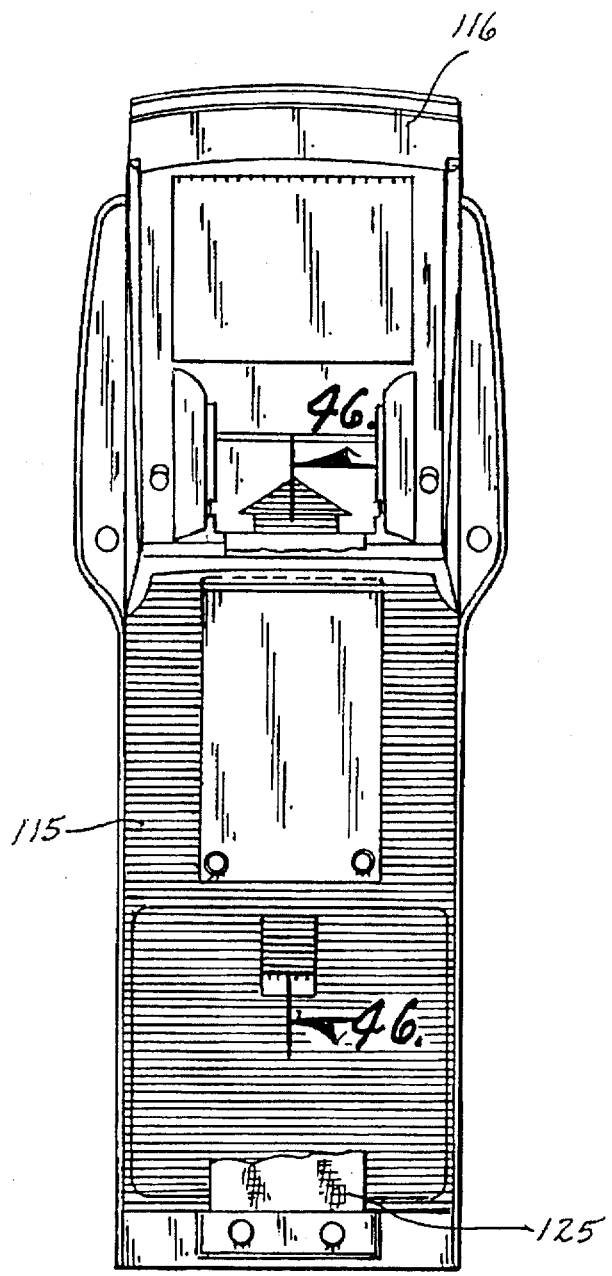
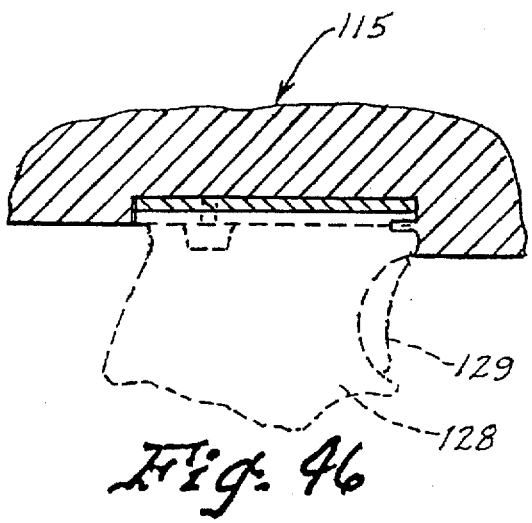
Fig. 45
Fig. 46

HAND-HELD TERMINAL WITH DISPLAY SCREENS, INTERACTIVE SCREENS, MAGNETIC CREDIT CARD READERS, SCANNERS, PRINTERS AND HANDLERS

CROSS REFERENCE TO RELATED APPLICATIONS (CLAIMING BENEFIT UNDER 35 U.S.C. 120)

This application is a continuation of 08/163,917 filed Dec. 8, 1993, now abandoned, which is a continuation-in-part of U.S. application Ser. No. 07/957,048 filed Oct. 5, 1992, now abandoned as of Dec. 8, 1993; which is a continuation-in-part of U.S. application Ser. No. 07/927,167 filed Aug. 5, 1992 by D. Schultz et al, now abandoned as of Oct. 5, 1992; which is, in turn, a continuation-in-part of U.S. application Ser. No. 07/878,866 filed May 5, 1992 by D. Schultz et al, now abandoned of Aug. 5, 1992; which is, in turn, a continuation-in-part of U.S. application Ser. No. 07/818,762 filed Jan. 10, 1992 by S. Koenck et al, now abandoned as of May 10, 1992; which is a continuation-in-part of U.S. application Ser. No. 07/816,888 filed Jan. 3, 1992, by D. Schultz et al, now abandoned as of Apr. 3, 1992; which is, in turn, a continuation-in-part of U.S. application Ser. No. 07/809,380 filed Dec. 18, 1991 by D. Schultz et al, now abandoned as of Feb. 18, 1992; (3) U.S. application Ser. No. 07/633,500 filed Dec. 26, 1990 by S. Koenck et al, now U.S. Pat. No. 5,202,817 issued Apr. 13, 1993; which is, in turn, a continuation-in-part (i) of U.S. application Ser. No. 07/626,711 filed Dec. 12, 1990, now abandoned as of Feb. 12, 1991; (ii) U.S. application Ser. No. 07/364,594 filed Jun. 7, 1989 by K. Cargin et al, now abandoned as of May 22, 1991; and (iii) U.S. application Ser. No. 07/364,902 filed Jun. 8, 1989 by A. Danielson et al, now abandoned as of Aug. 12, 1991; (4) U.S. application Ser. No. 07/660,615 filed Feb. 25, 1991 by Koenck et al, now U.S. Pat. No. 5,218,187 issued Jun. 8, 1993; which is, in turn, a continuation-in-part of(i) PCT/US90/0328 filed Jun. 7, 1990 with an International Publication Date of Dec. 27, 1990 as WO/90/16033; and (ii) U.S. application Ser. No. 07/467,096 filed Jan. 18, 1990, now U.S. Pat. No. 5,052,020 issued Sep. 24, 1991; (5) U.S. application Ser. No. 07/674,756 filed Mar. 25, 1991, now abandoned as of Dec. 8, 1992; (6) U.S. application Ser. No. 07/816,705 filed Jan. 2, 1992 by D. Schultz, now abandoned as of Jun. 2, 1992; which is, in turn, a continuation-in-part of U.S. application Ser. No. 07/812,767 filed Dec. 23, 1991 by D. Schultz, now abandoned as of Feb. 23, 1992; (7) U.S. application Ser. No. 07/777,393 filed Jan. 7, 1992, now U.S. Pat. No. 5,410,141 issued Apr. 25, 1995; and (8) U.S. application Ser. No. 07/818,761 filed Jan. 10, 1992 by D. Schultz, now abandoned as of May 10, 1992; which is, in turn, a continuation-in-part of application Ser. No. 07/727,021 filed Jul. 8, 1991, now U.S. Pat. No. 5,202,825 issued Apr. 13, 1993; which is, in turn, a division of U.S. application Ser. No. 07/345,145 filed Apr. 28, 1989, now U.S. Pat. No. 5,031,098 issued Jul. 9, 1991.

PCT/US90/0328 filed Jun. 7, 1990 with an International Publication Date of Dec. 27, 1990 as WO/90/16033, and U.S. application Ser. No. 07/626,711 filed Dec. 12, 1990 by S. Koenck et al, now abandoned as of Feb. 12, 1991, and PCT/US91/09421 filed Dec. 12, 1991 with an International Publication Date of Jun. 25, 1992, and U.S. application Ser. No. 07/777,393 filed Jan. 7, 1992, now U.S. Pat. No. 5,410,141 issued Apr. 25, 1995.

AUTHORIZATION PURSUANT TO 37 CFR. 1.71 (d) (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

The foregoing co-pending and earlier applications and PCT publications are hereby incorporated herein by reference in their entirety, including drawings and appendices.

TECHNICAL FIELD

The present invention relates generally to a hand-held terminal for receiving, storing and transmitting information and more particularly to such a hand-held terminal having a modular magnetic credit card reader operatively and removably attached thereto and being interchangeable with a modular scanner for reading bar codes or the like. Modular display screens, printers, and handles are also shown.

BACKGROUND ART

Devices for reading the magnetic stripe on credit cards are in common usage at retail check-out stations. These credit card readers are typically attached to a large cash register type terminal adjacent a counter where goods are placed by the customer and then purchased in conventional ways such as by paying cash, by check or by credit card. Consequently, it is not possible or feasible for a customer to actually purchase the goods at the places where they are actually displayed in a retail setting, but instead the customer must assemble its goods in a shopping cart or the like and take it to the aforementioned check-out counter which has a magnetic credit card reader. Consequently, there is a need for a device to facilitate the reading of the magnetic stripe of a credit card anywhere and under almost any conditions. Also, there is a need for modular display screens, interactive screens, handles and modular, compact printers which can be operatively attached to the hand held terminals.

DISCLOSURES OF THE INVENTION

The present invention relates generally to a hand-held terminal for receiving, storing and transmitting information. The terminal has a keyboard, a display and is powered by internal, rechargeable batteries. The terminal can also have a display screen with which the user can interact using a writing instrument. This type of terminal is called a pen based system. The terminal with a pen based screen can be operated without the need for a keyboard. A keyboard is, however, a useful device for entering information when there is a relatively small set of entries which account for the majority of inputs.

A low-power radio frequency transceiver, for example, using a spread spectrum technology (SST), is provided for receiving and transmitting information between the terminal and a base radio transceiver. A modular, magnetic credit card reader is operably and removably attached to the terminal and is interchangeable with a scanner of the type which can read bar codes or the like. Modular display screens are also disclosed.

An object of the present invention is to provide an improved hand-held terminal.

Another object of the present invention is to provide a hand-held terminal having a magnetic credit card reader integrated therein.

A further object of the present invention is to provide a hand-held terminal having a magnetic credit card reader which is modular and which is interchangeable with a modular scanner of the type which will read bar codes.

Another object of the present invention is to provide modular display screens for hand-held terminals.

Another object of the present invention is to provide modular, compact printers for hand-held terminals.

Still another object of the present invention is to provide a handle for hand-held terminals.

Still another object of the present invention is to provide a modular, rotatable keypad for a pen based terminal.

Still another object of the present invention is to provide a modular accepting hand-held terminal small enough to fit in the average sized men's shirt pocket.

Still another object of the present invention is to provide a printer module capable of receiving several other module and terminals.

Still another object of the present invention is to provide a housing with resilient safety features.

Another object of the present invention is to provide a keyboard with a keyboard matrix for designating special functions of the keyboard in special use applications of a hand-held terminal.

Yet another object of the present invention is to provide a simple and efficient scanner trigger device.

Still another object of the present invention is to provide a simple, compact and space-saving battery charging circuit.

Yet another object of the present invention is to provide a battery charging circuit that uses a commercially available fixed voltage power supply in a controlled current profile charging circuit.

Hence, a further object of the present invention is to provide a current source using a commercially available fixed voltage power supply as a current driving device.

Other objects, advantages, and novel features of the present invention will become apparent from the following detailed description of the invention when considered in conjunction with the accompanying drawings.

BRIEF DESCRIPTION OF THE DRAWINGS

FIG. 18 is a perspective view of a computer terminal having modular parts therefor;

FIG. 19 is a exploded view of the terminal of FIG. 18 showing various interchangeable display screens, some with function buttons and some without function buttons, an interchangeable keyboard and an interchangeable CPU/memory module;

FIG. 20 is a partial front view of the unit shown in FIG. 18;

FIG. 21 is a partial front view of the terminal of FIG. 18 with a different display screen thereon;

FIG. 22 is a partial front view similar to FIGS. 20 and 21 but showing still another modular display unit attached to the terminal;

FIG. 23 is a side elevational view of the computer terminal of FIG. 18;

FIG. 24 is a front view of another hand held terminal;

FIG. 25 is a side view taken along line 25—25 of the hand-held terminal of FIG. 24;

FIG. 26 is a bottom view taken along line 26—26 of the hand-held terminal FIG. 24;

FIG. 41 is a front view of another embodiment of a hand held terminal built in accordance with the present invention;

FIG. 42 is a top view taken along line 42—42 of the hand held terminal of FIG. 41;.

FIG. 43 is a side view taken along line 43—43 of the hand held terminal of FIG. 42;

FIG. 44 is a bottom view taken along line 44—44 of the hand held terminal of FIG. 41;

FIG. 45 is a bottom view taken along line 45—45 of the hand held terminal of FIG. 43;

FIG. 46 is a partial cross-sectional view taken along line 46—46 of the hand held terminal of FIG. 45;

Figure 62:
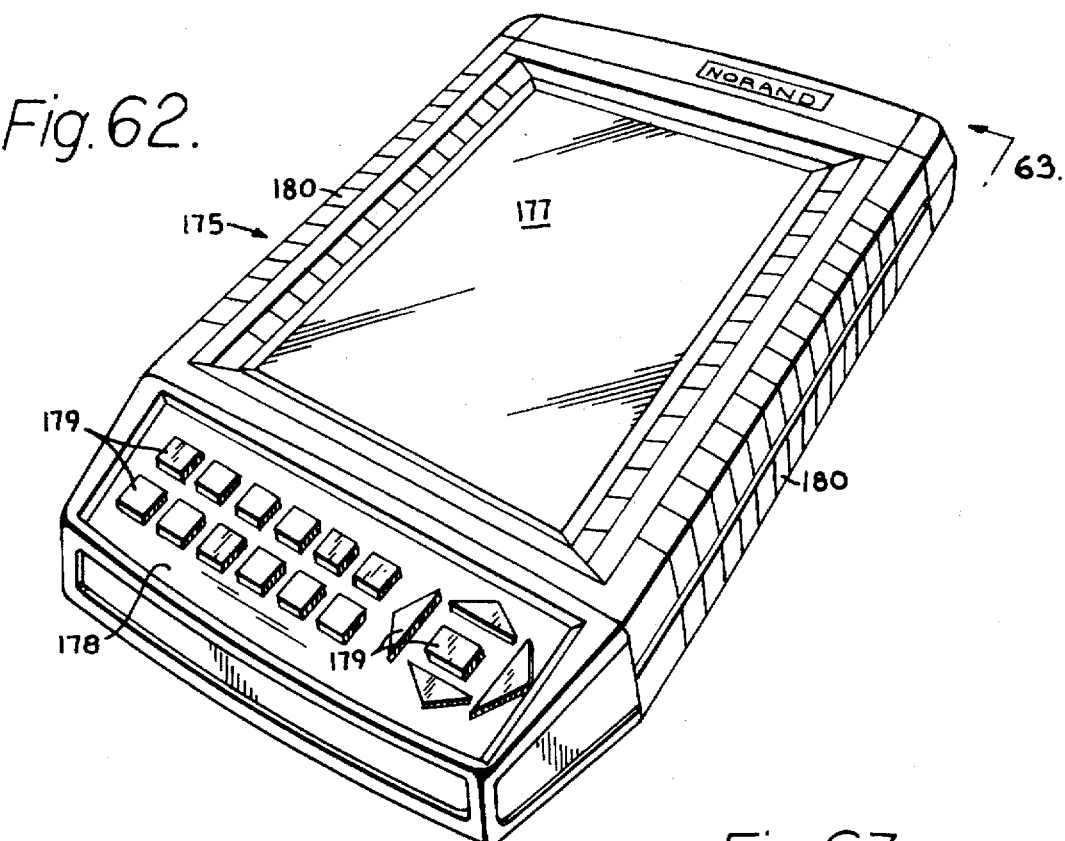
FIG. 62 is perspective view of still another hand-held terminal built in accordance with the present invention.
Figure 63:
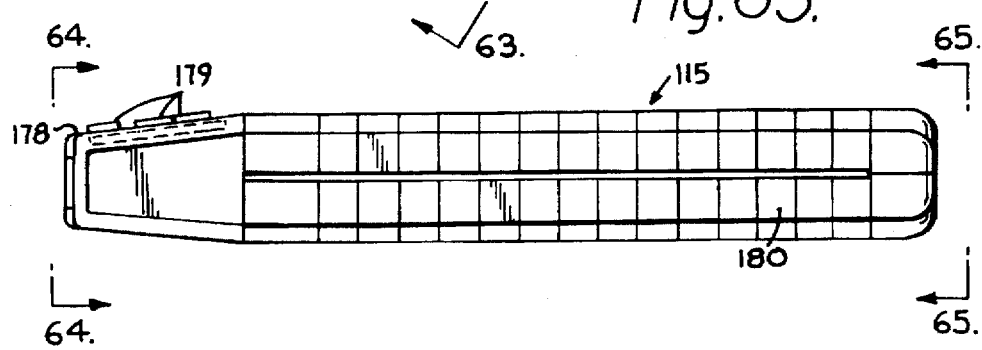
Figure 64:
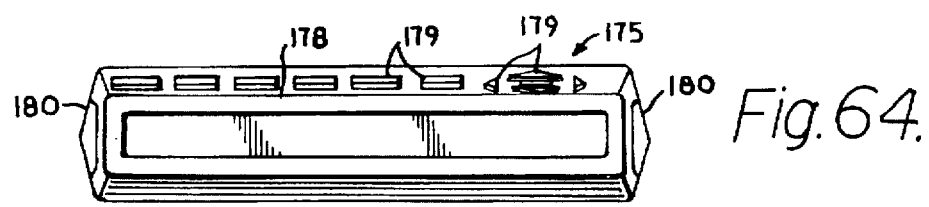
Figure 65:
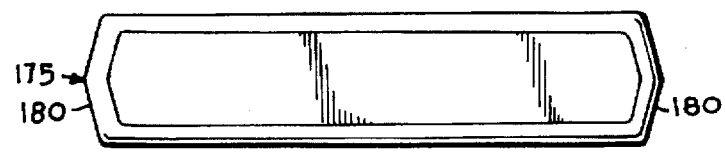
Figure 66:
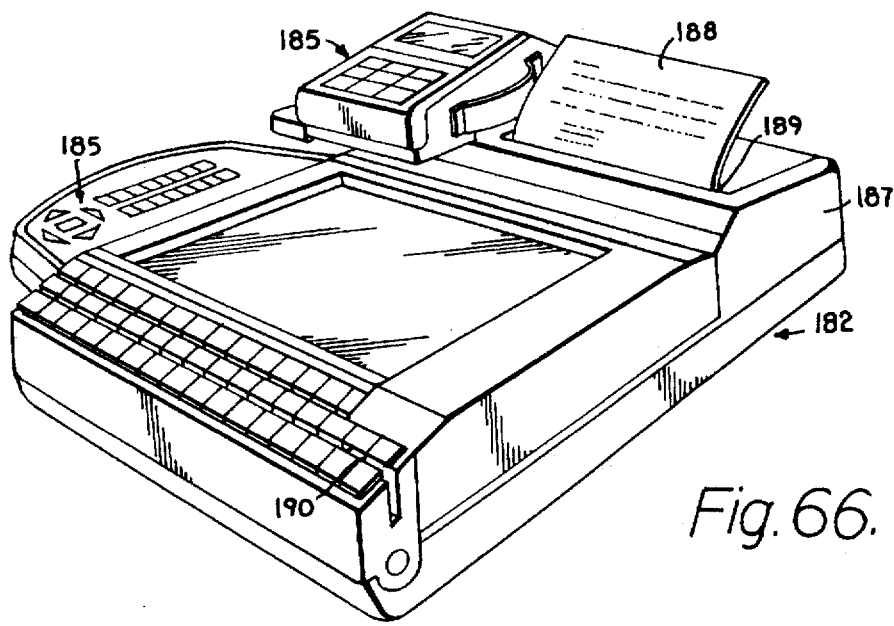
Figure 67:
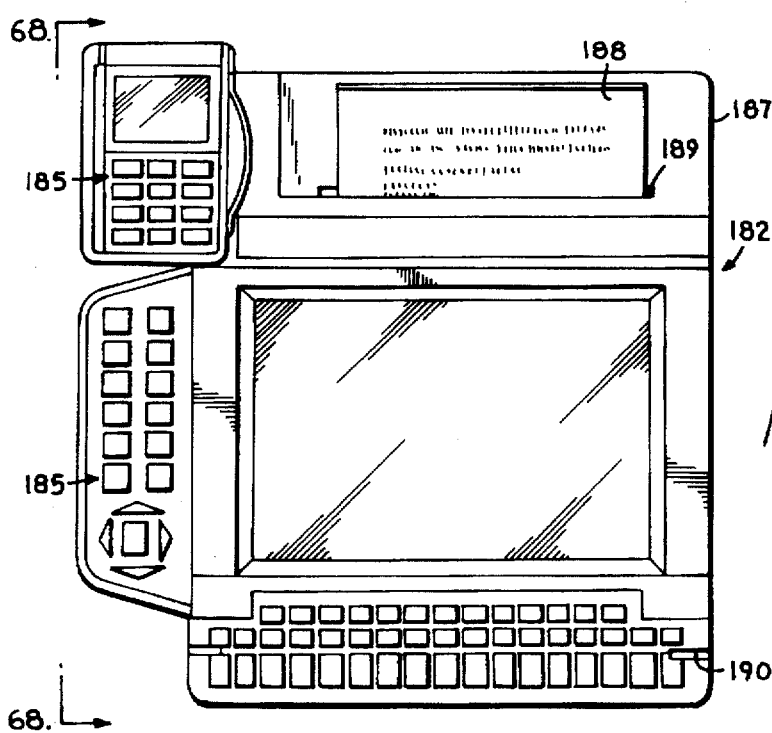
Figure 68:
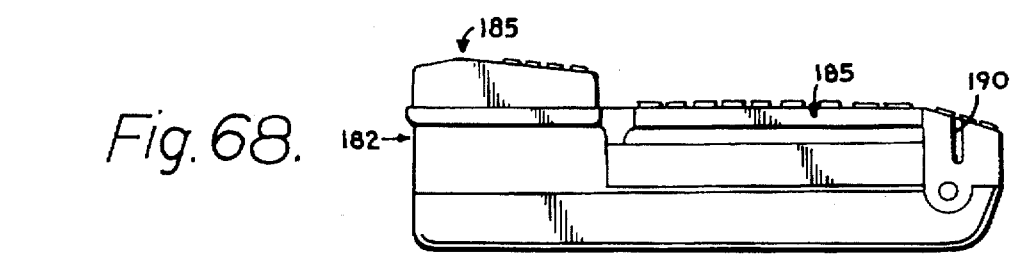
Figure 69:
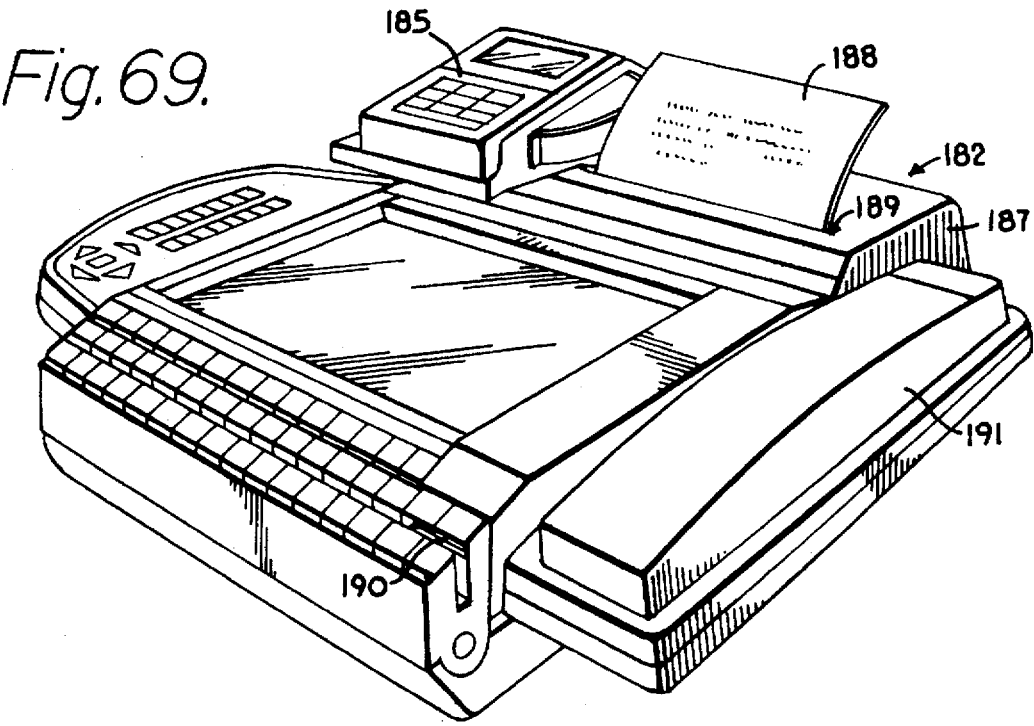
Figure 70:
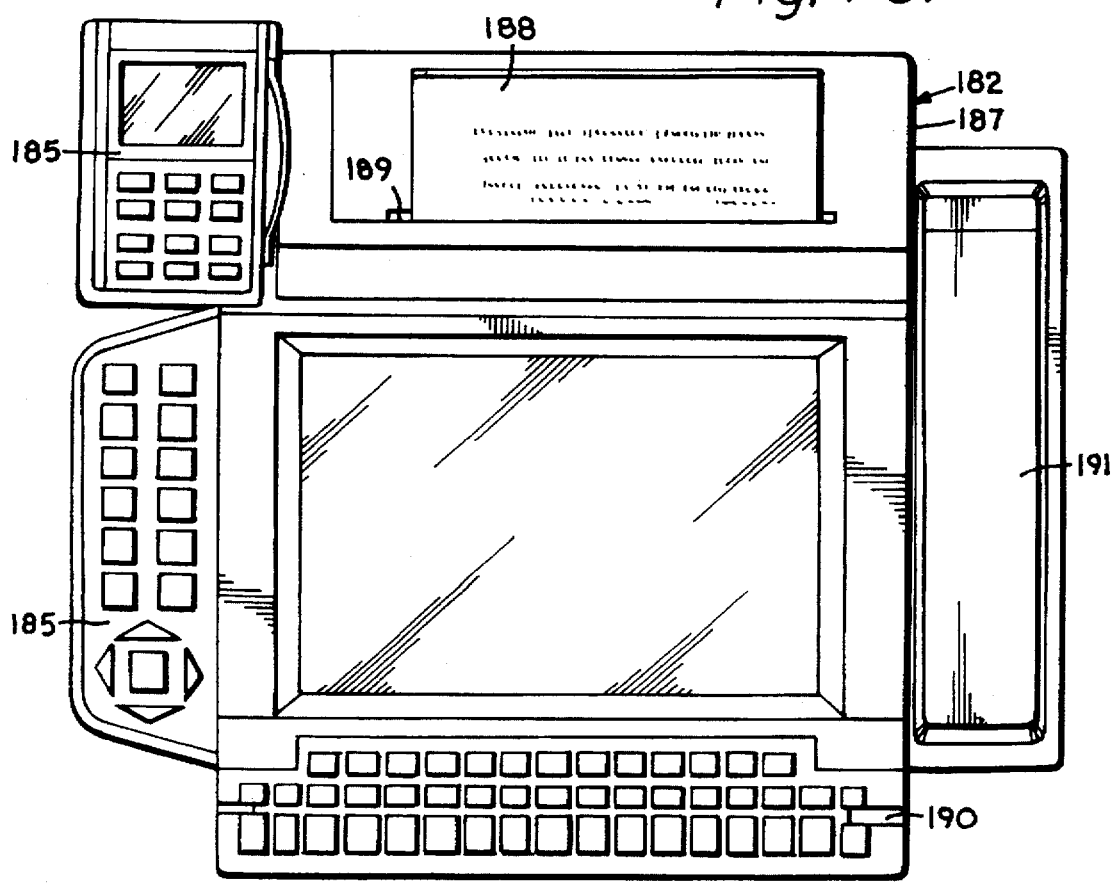
Figure 71:
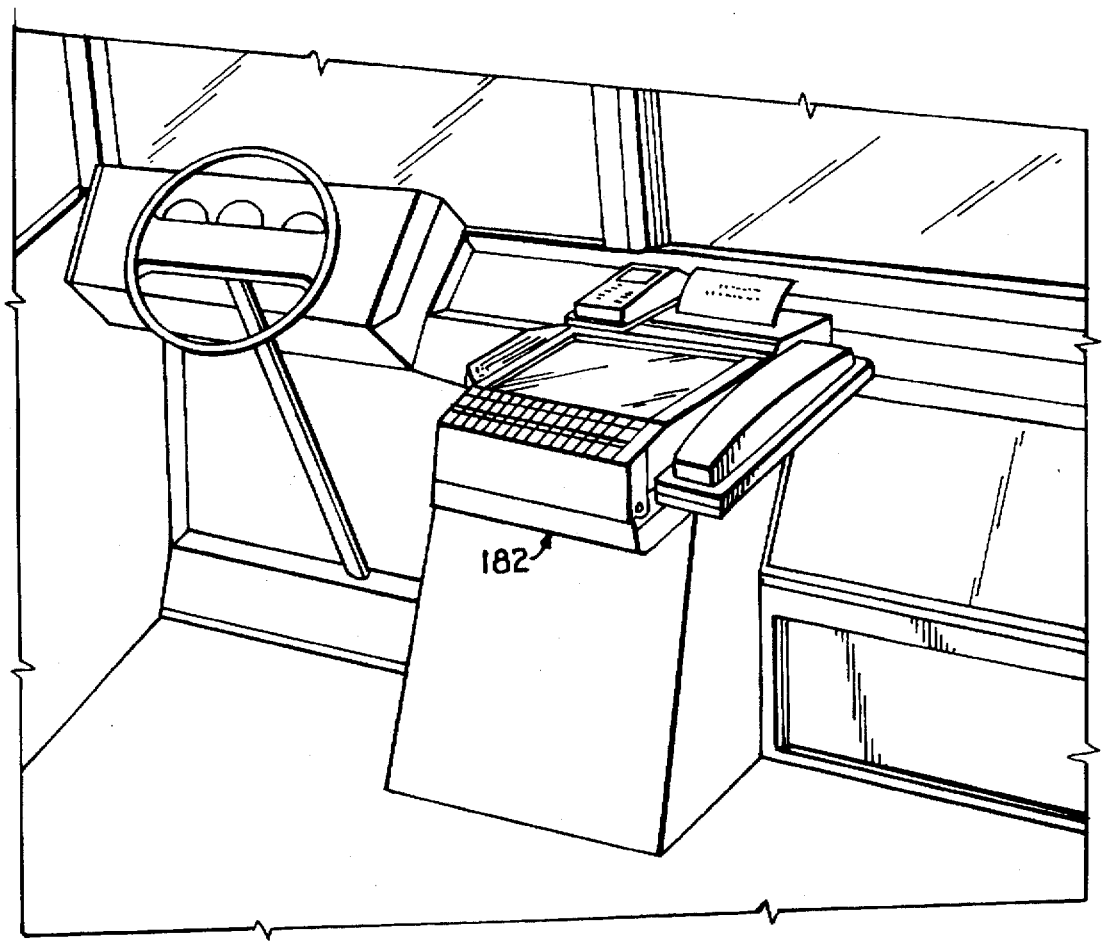
Figure 72:
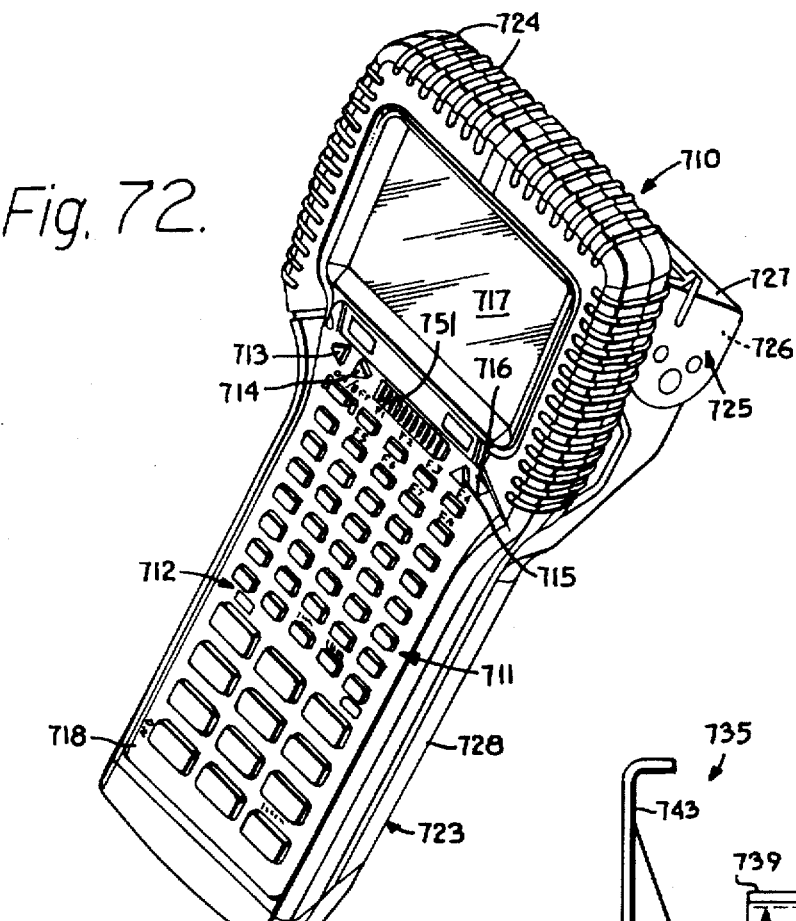
Figure 75:
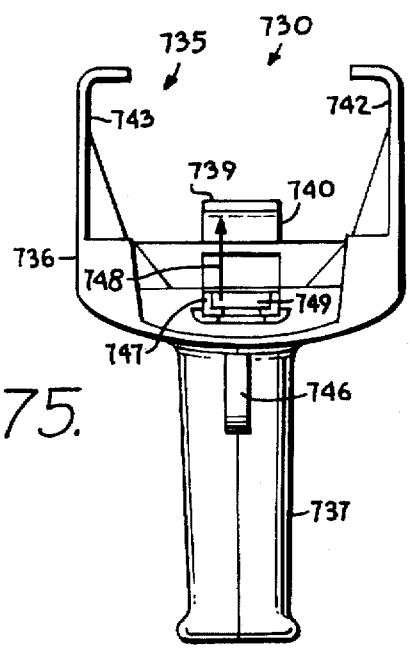
Figure 74:
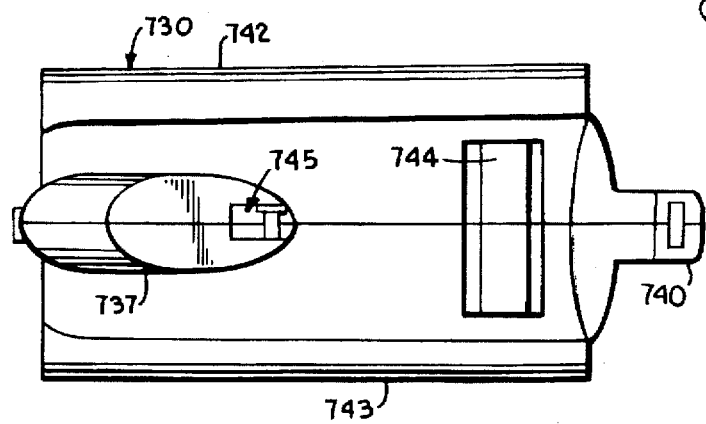
Figure 73:
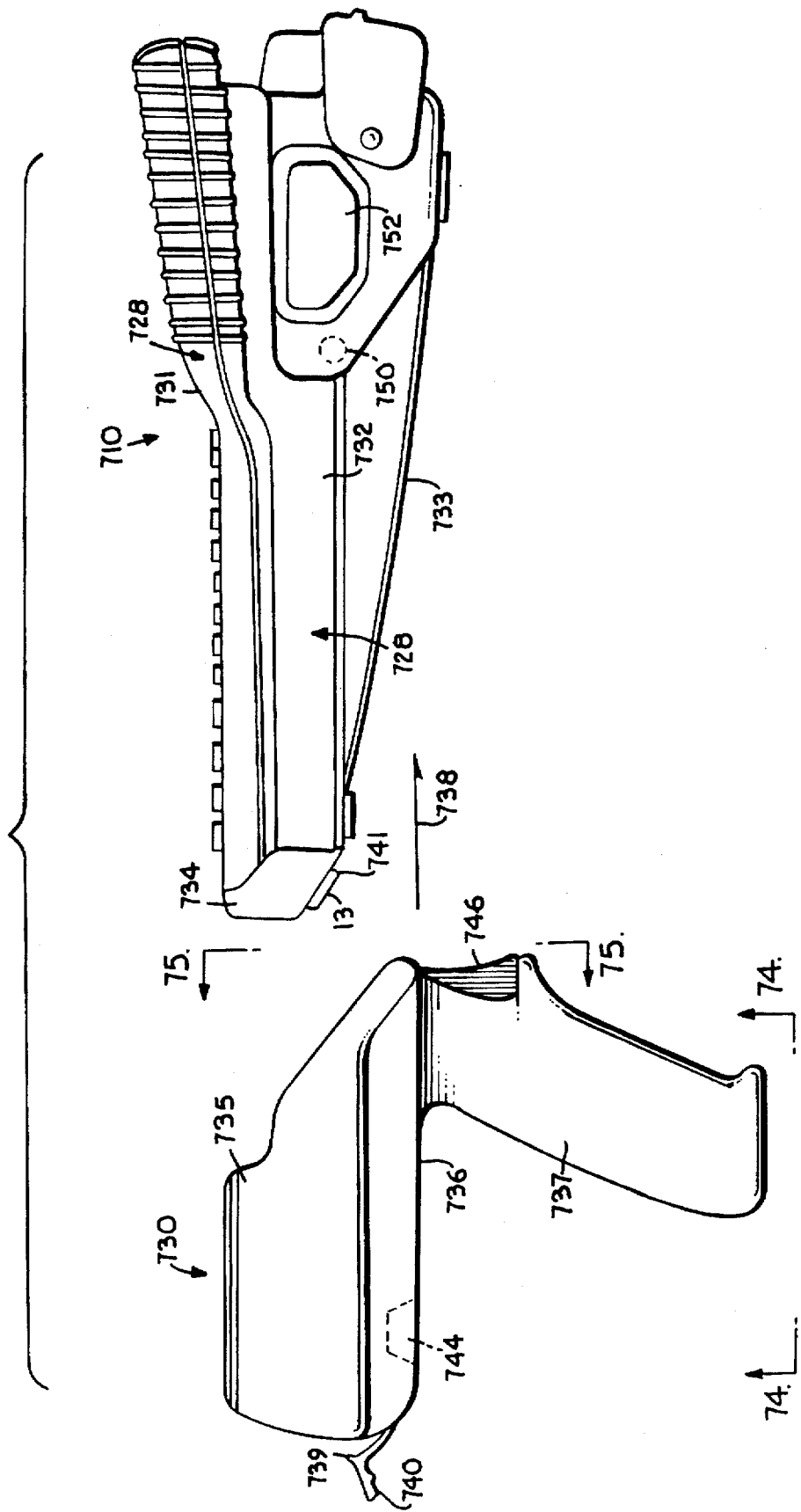

FIG is a side elevational view taken along line 63—63 of the hand-held terminal of FIG. 62;

FIG. 64 is a front elevational view taken along line 64—64 of the hand-held terminal of FIG. 63;

FIG. 65 is a rear elevational view taken along line 65—65 of the hand-held terminal of FIG. 63;

FIG. 66 is a perspective view of printer module with a magnetic card reader and two attached hand held terminals;

FIG. 67 is a top plan view of the printer module and attachments of FIG. 66;

FIG. 68 is a side elevational view taken along line 68—68 of the printer module and attachments of FIG. 67:

FIG. 69 is a perspective view of the printer module and terminals of FIG. 66 with an attached telephone;

FIG. 70 is a top plan view of the printer module and terminals of FIG. 69;

FIG. 71 is a perspective view of the printer module and terminals FIG. 69 installed for use in a vehicle;

FIG. 72 is a pictorial representation of a hand-held terminal similar to the hand-held terminal shown in FIGS. 1–5, showing further improvements in accordance with the present invention;

FIG. 73 is ma side elevation of the hand-held terminal shown in FIG. 72 shown in an exploded view with a pistol grip handle or attachment in accordance with the present invention;

FIG. 74 is a bottom view of the pistol grip attachment of the hand-held terminal shown in FIG. 73, showing a release gripper recess;

FIG. 75 is an end view of the pistol grip attachment shown in FIG. 73; and

Figure 76:
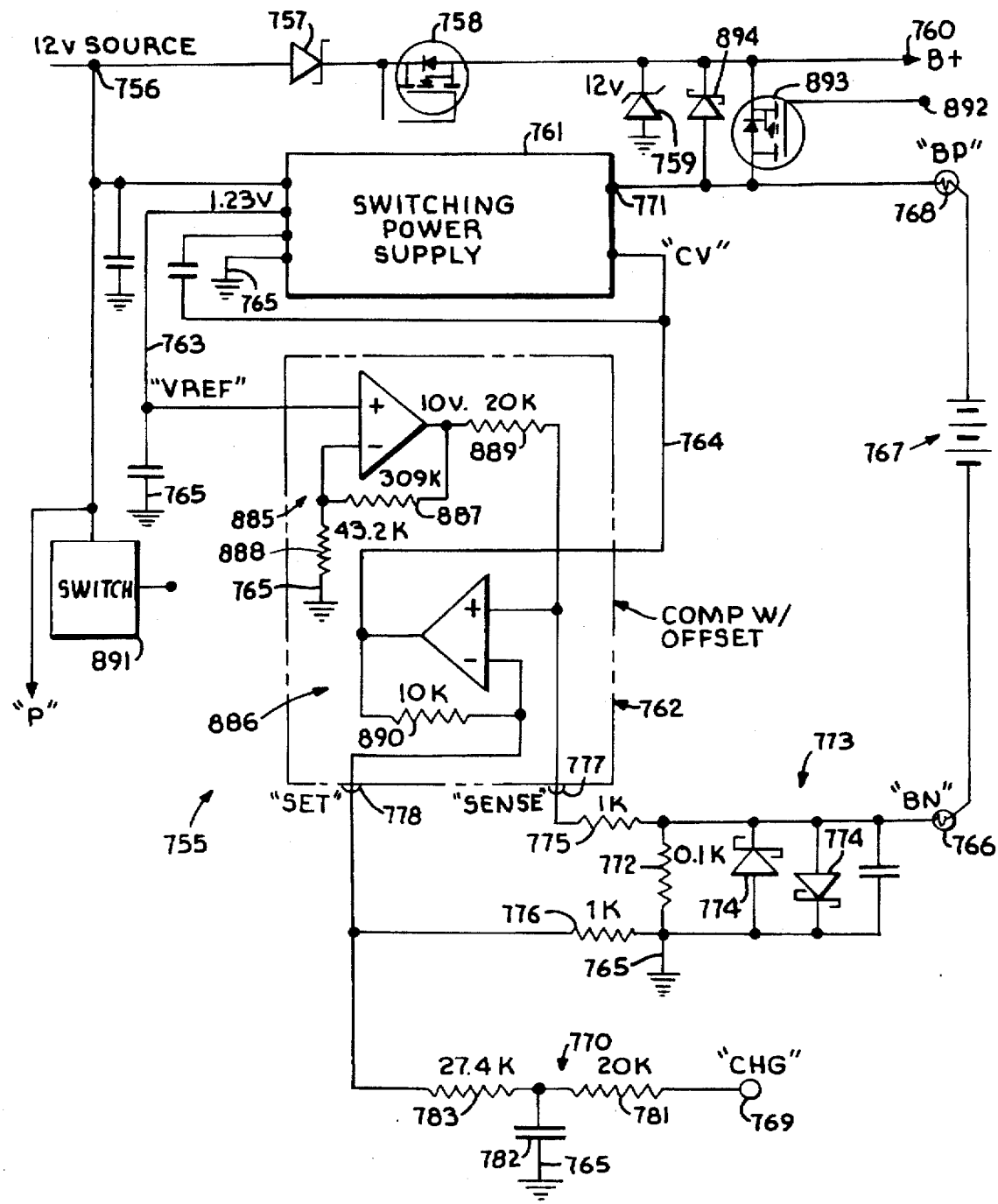

FIG. 76 is a schematic diagram of a battery charging circuit in accordance with the present invention.

BEST MODES FOR CARRYING OUT THE INVENTION

Figure 1:
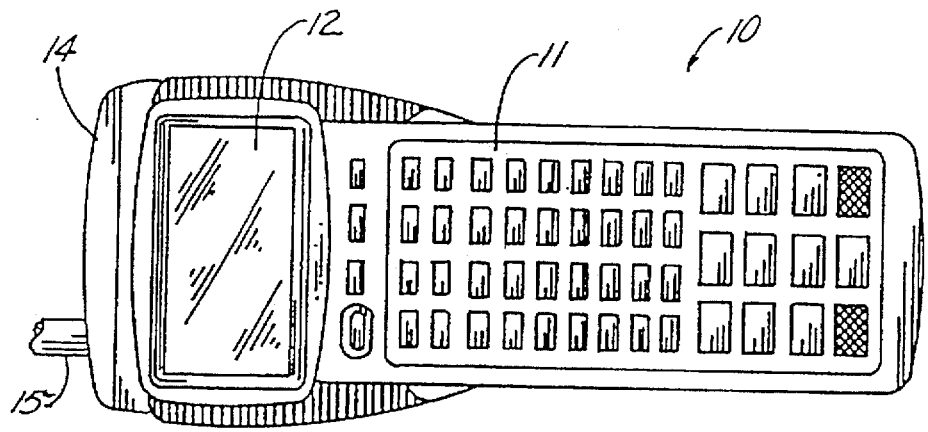
FIG. 1 is a front view of a hand-held terminal constructed in accordance with the present invention.
Figure 2:
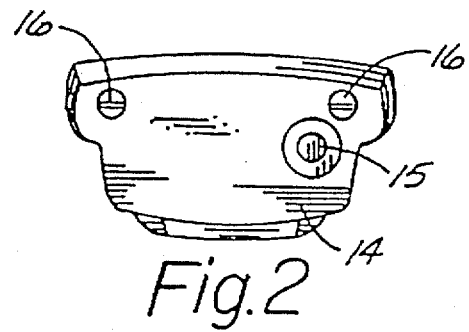
FIG. 2 is a top view of the hand-held terminal.
Figure 3:
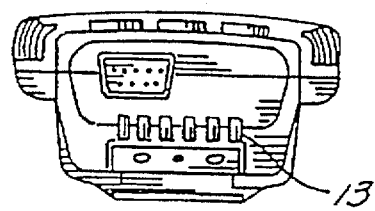
FIG. 3 is a bottom view of the hand-held terminal.
Figure 4:
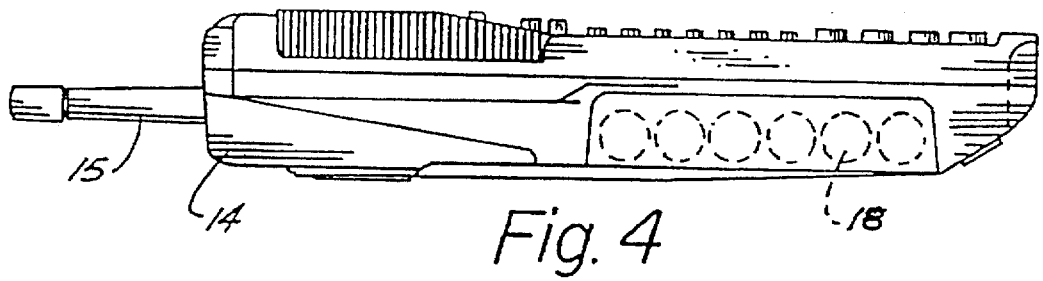
FIG. 4 is a side view of the hand-held terminal showing re-chargeable batteries in dashed lines.

Referring now to the drawings wherein like reference numerals designate identical or corresponding parts throughout the several views, FIG. 1 shows a terminal (10) constructed in accordance with the present invention and having a keyboard (11) and a display (12) thereon. A top view of the hand-held terminal in FIG. 2 shows a top (14). FIG. 3 shows docking contacts (13) for transmitting information and/or re-charging batteries (18) shown in FIG. 4. A top view of the hand-held terminal shown in FIG. 2 shows the top (14) having an antenna (15) can be held to the terminal (10) by threaded fasteners (16).

Figure 5:
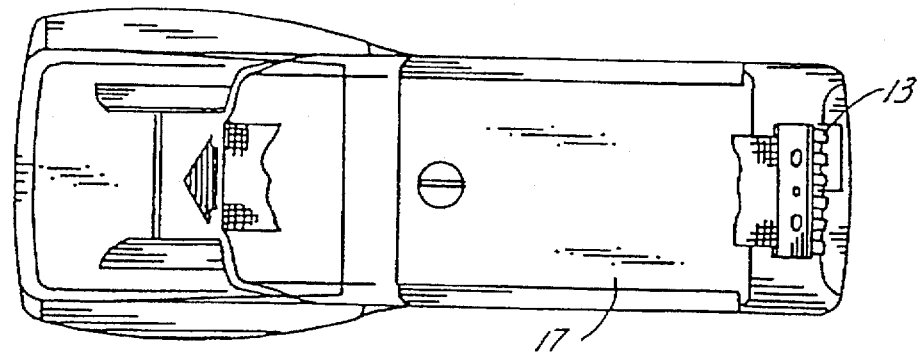
FIG. 5 is a rear view of a hand-held terminal of FIG. 1.
Figure 6:
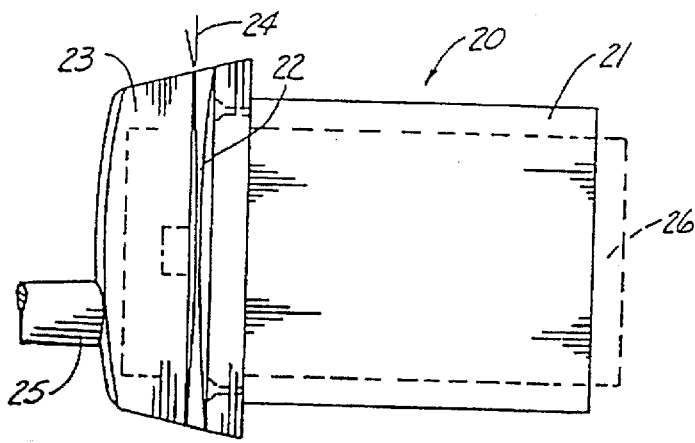
FIG. 6 is a modular, magnetic credit card stripe reader which interchangeably fits in the top of the hand-held unit shown in FIGS. 1–5 for replacing the portion in FIG. 1 having the antenna attached thereto.
Figure 7:
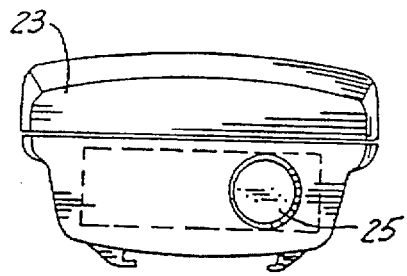
FIG. 7 is a top view of the magnetic credit card reader shown in FIG. 6.
Figure 8:
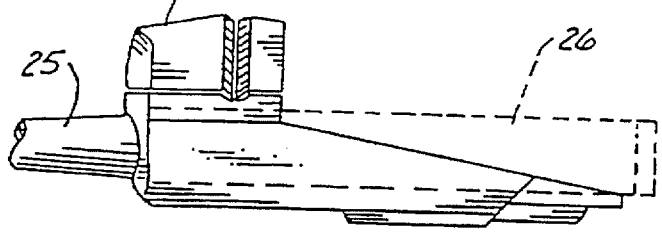
FIG. 8 is a side view of the FIG. 6 device.
Figure 9:
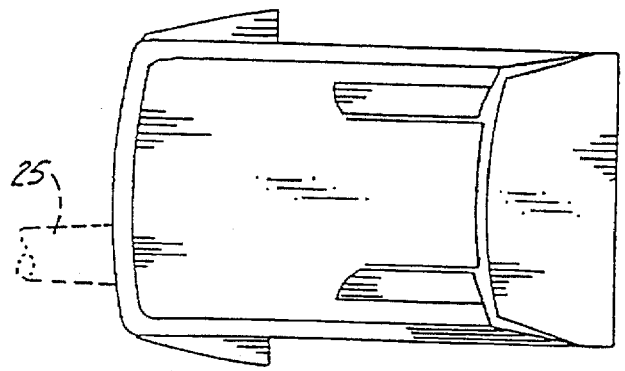
FIG. 9 is bottom view of the FIG. 6 device.

Referring to FIG. 5, it is noted that panel (17) can be removed to provide access to the re-chargeable batteries (18).

Referring to FIGS. 6–9, a modular, magnetic credit card reader (20) is shown which is interchangeable with the top (14) of the terminal of FIG. 1. Once the top (14) has been removed from the hand-held terminal (10) and portions (21) inserted into the internal cavity if the hand-held unit (10) behind the display (12) shown in FIG. 1, the magnetic credit card reader is automatically plugged into the hand-held terminal (10) by connectors (not shown).

A slot (22) is provided in enlarged portion (23) of the magnetic credit card reader (20) so that a credit card (24), when it passes through the slot (22), will be read by reading the magnetic stripe attached thereto as the magnetic stripe passes through the slot (22) as is conventional with credit card readers which are attached to check-out stations in a retail setting or the like.

Figure 17:
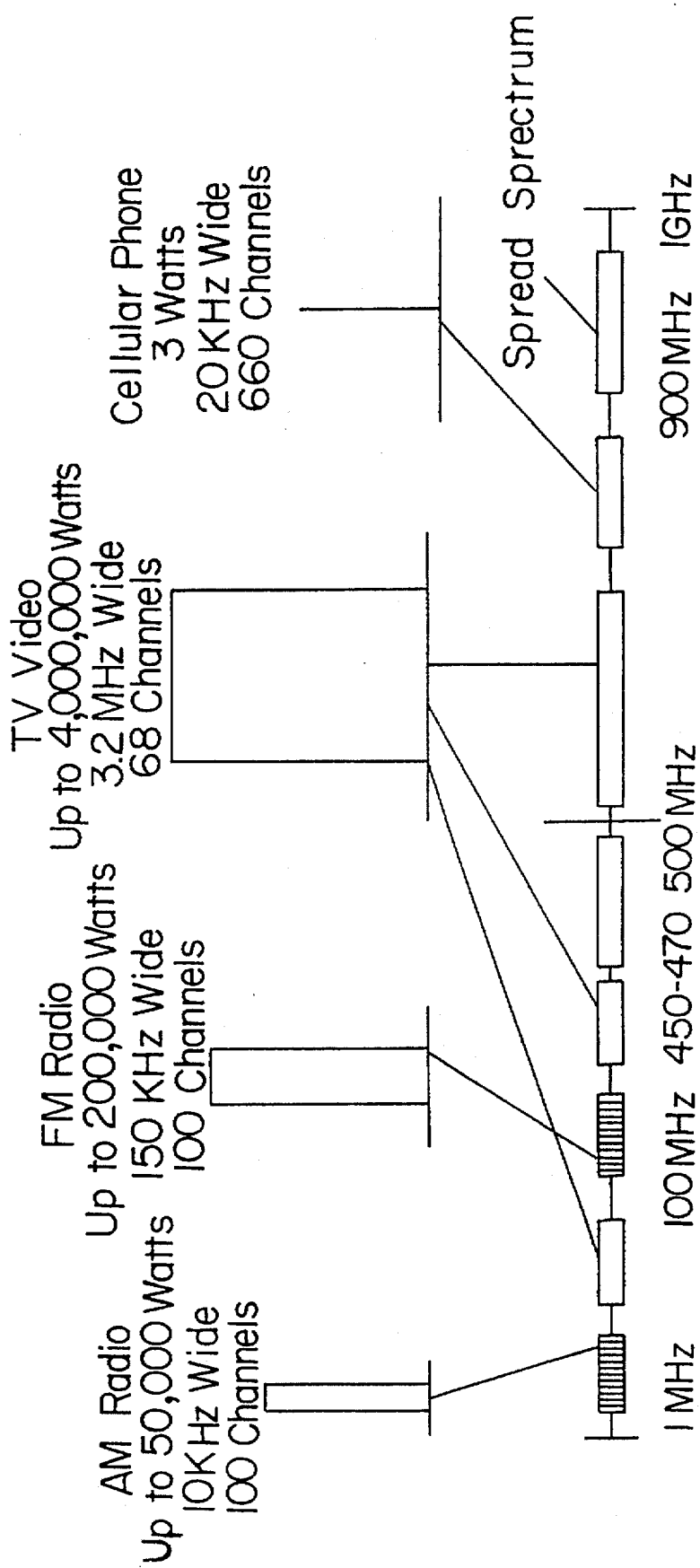
FIG. 17 is a schematic view showing the frequency of the spread spectrum technology compared to the frequencies of other commonly used technologies.
Figure 27:
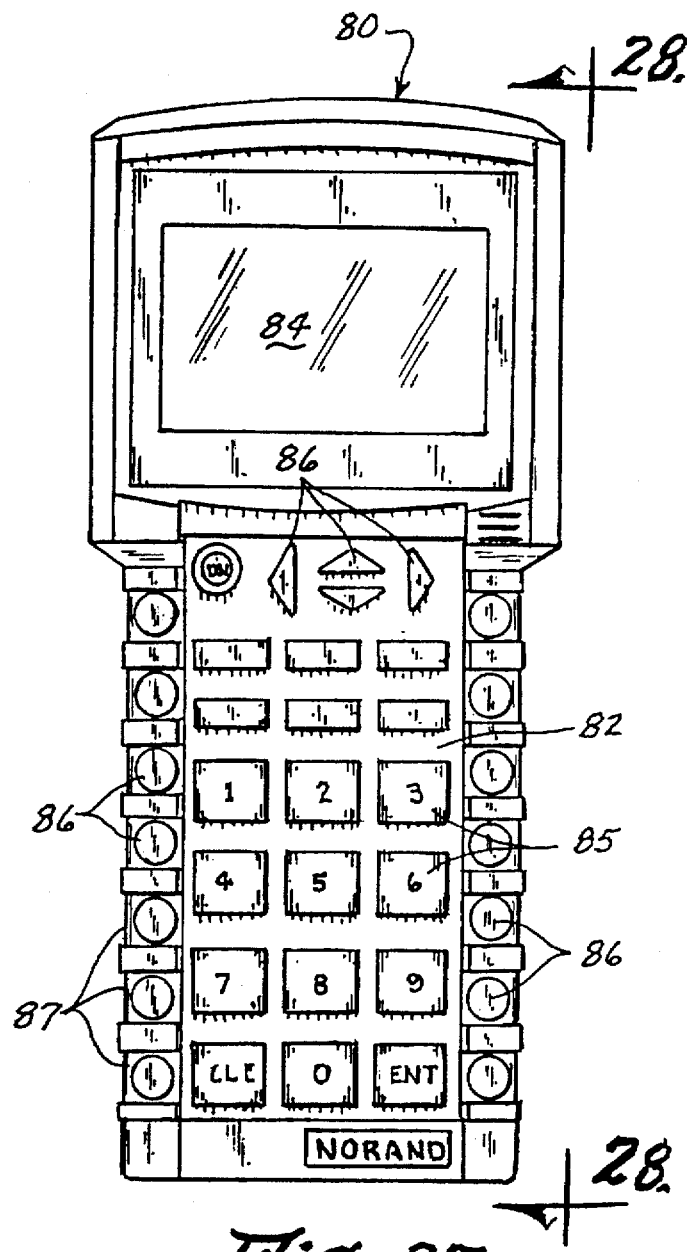
FIG. 27 is a bottom front view of still another hand held terminal built in accordance with the present invention.
Figure 28:
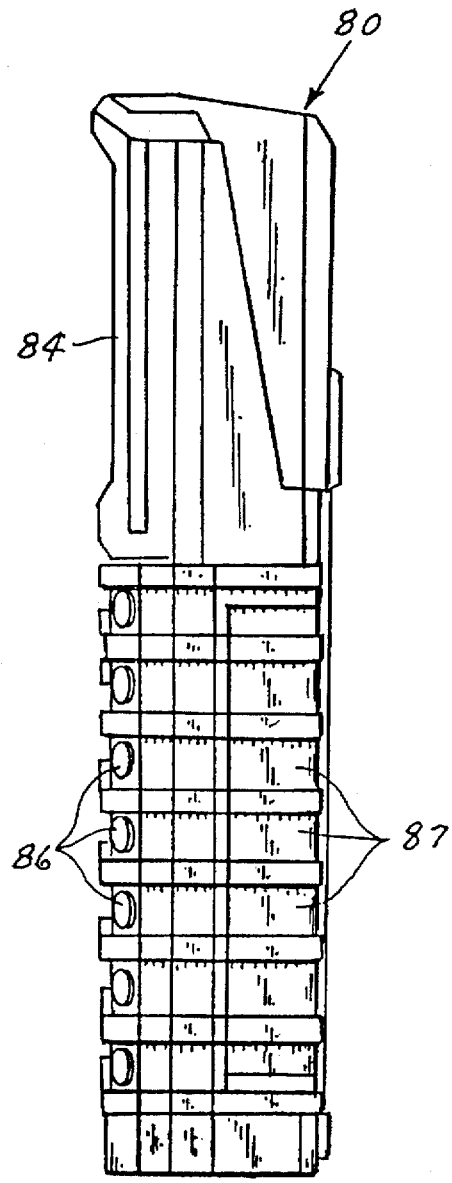
FIG. 28 is a side view taken along line 28—28 of the hand held terminal of FIG. 27.
Figures 29, 30:
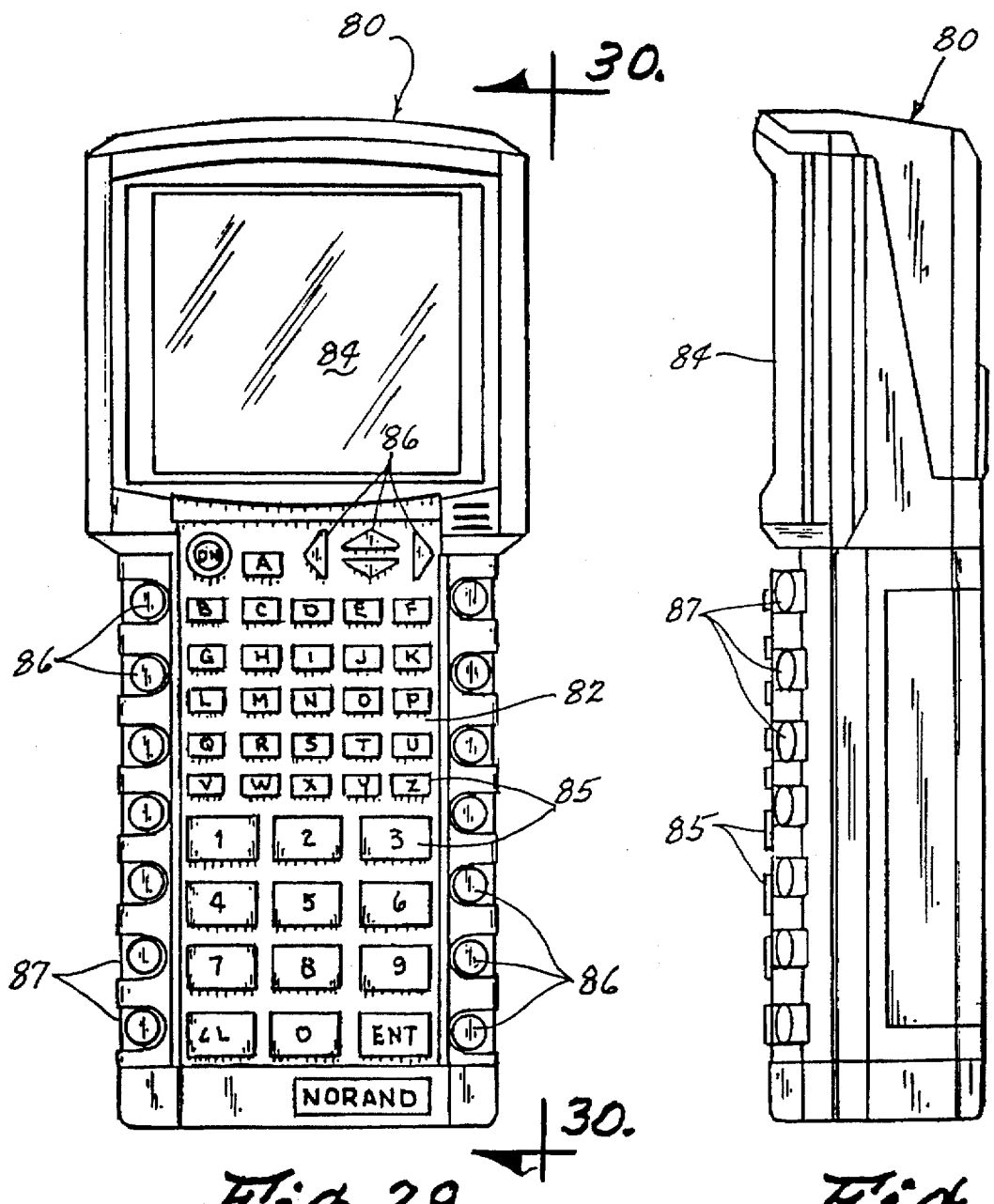
FIG. 29 is a front view of still another hand held terminal.
FIG. 30 is a side view taken along line 30—30 of the hand held terminal of FIG. 29.
Figures 31, 32:
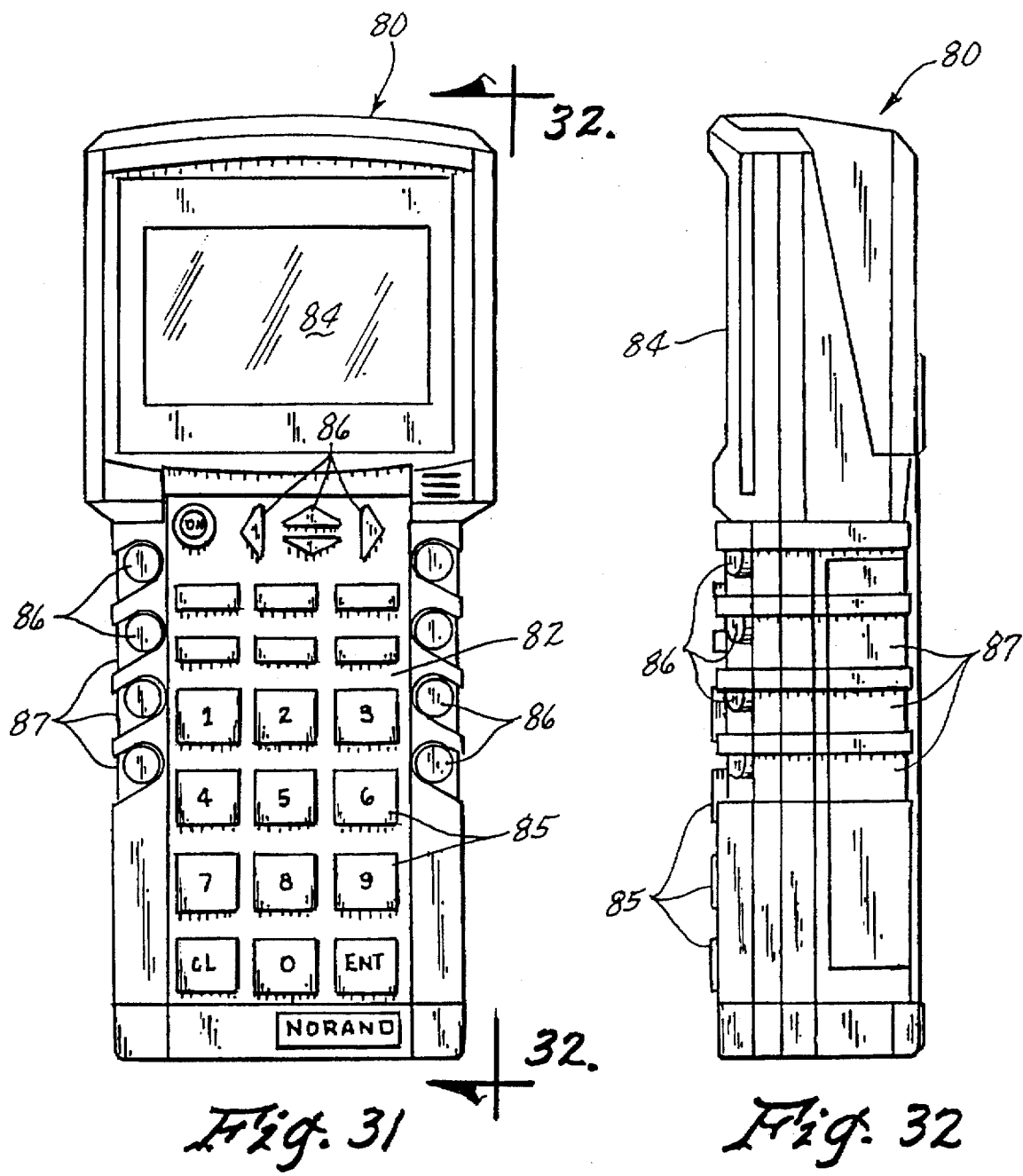
FIG. 31 is a front view of still another hand held terminal showing further variations of the control keys and display screen.
FIG. 32 is a side view taken along line 31—31 of the hand held terminal of FIG. 31.
Figure 33:
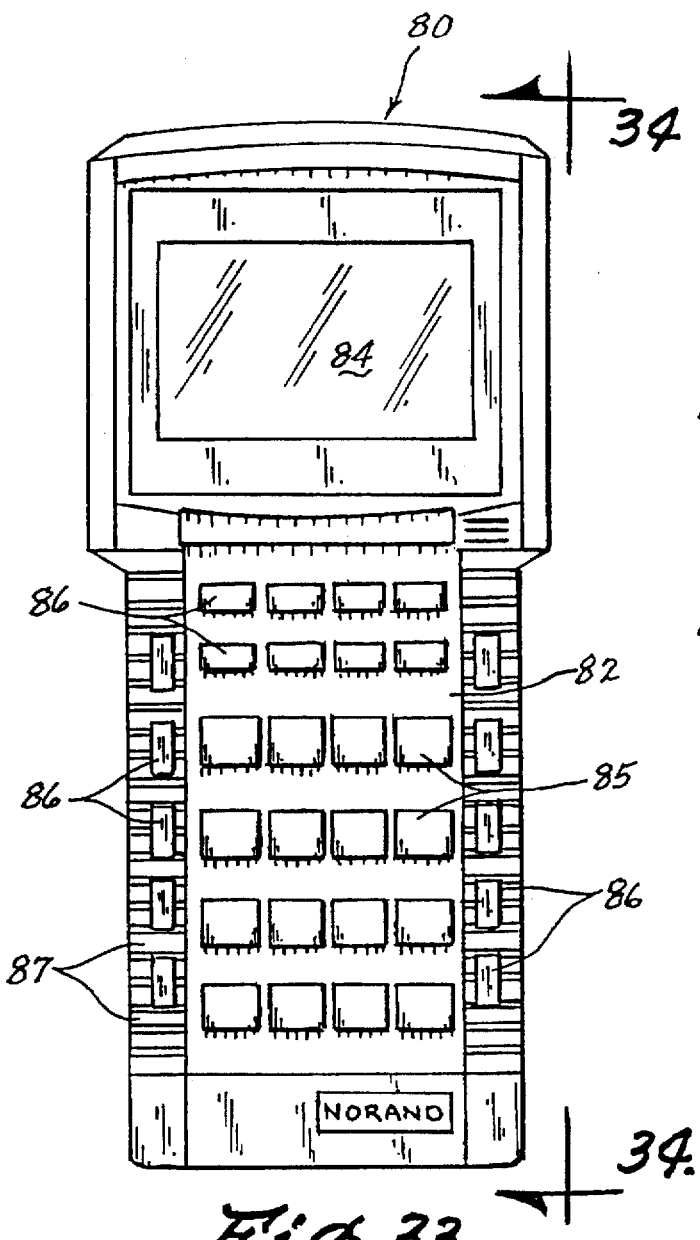
FIG. 33 is a front view of still another hand held terminal.
Figure 34:
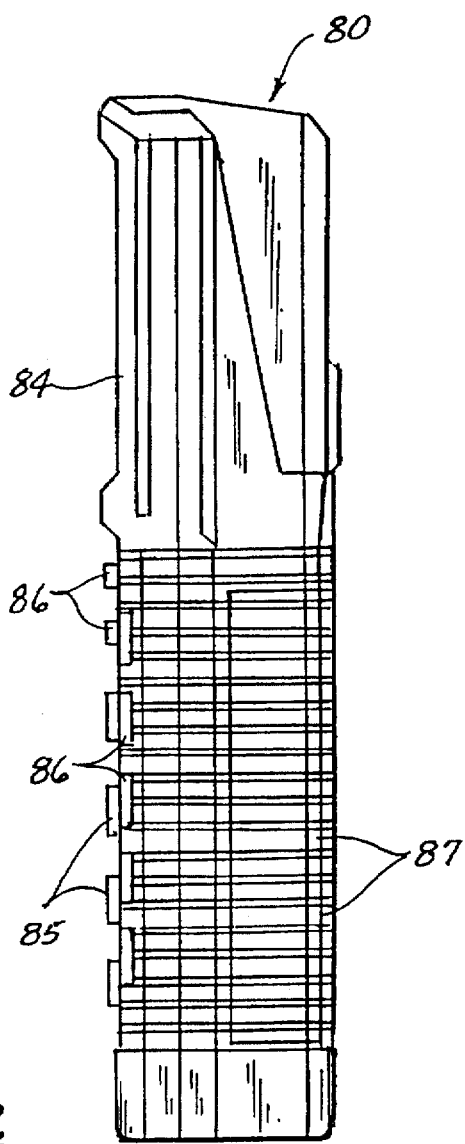
FIG. 34 is a side view taken along line 34—34 of the hand held terminal of FIG. 33.

An antenna (25) is attached to enlarged portion (23) for receiving and transmitting signals in a spread spectrum range, for example, as shown in the chart of FIG. 17. A spread spectrum technology radio (SST) (26) is attached to the modular credit card reader (20) as is clearly shown in FIGS. 6 and 8.

Figure 10:
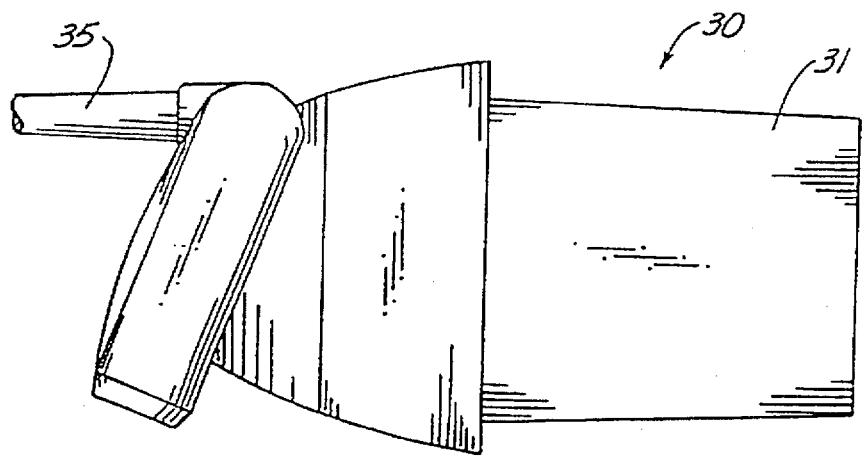
FIG. 10 is a modular bar code scanner with an antenna attached thereto which can replace and is interchangeable with the standard top of the terminal shown in FIG. 1 or the credit card reader shown in FIG. 6–9 or the scanner shown in FIGS. 13–16.
Figure 11:
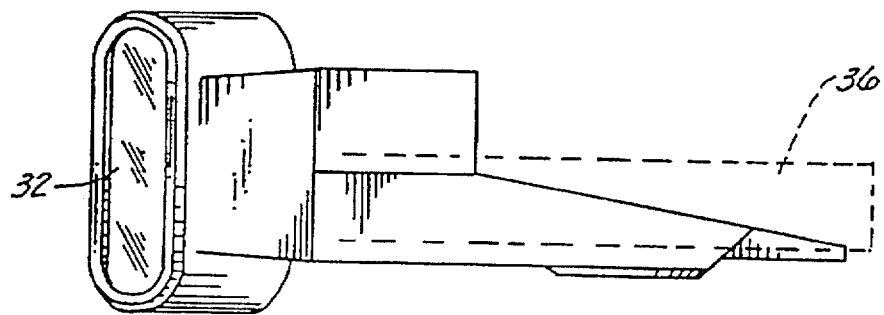
FIG. 11 is a side view of the FIG. 10 scanner.
Figure 12:
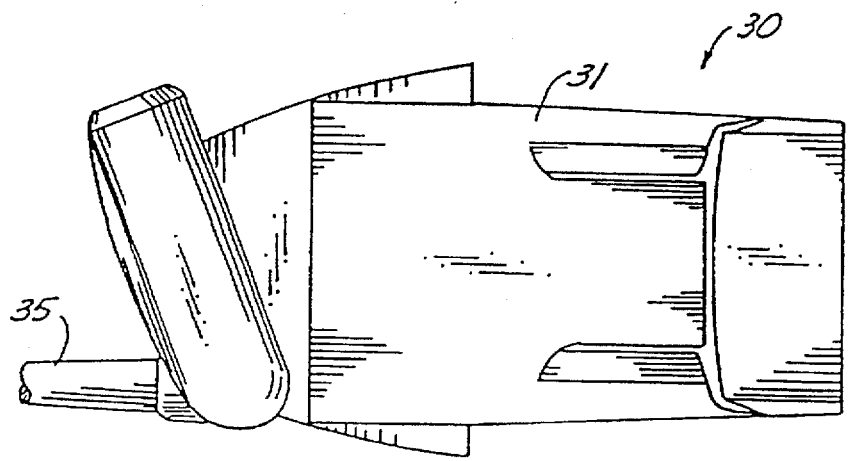
FIG. 12 is a bottom view thereof.

If it is desired to use a bar code reader with the hand-held terminal (10) instead of a credit card reader (20), then the scanner (30) of FIGS. 10–12 can be used to replace the magnetic credit card reader (20) shown in FIGS. 6–9. By merely sliding the credit card reader (20) out of the cavity in the top of the hand-held terminal (10) and sliding portion (31) of scanner (30) therein, the scanner (30) can be used to read bar codes or the like. A scanner window (32) is merely pointed towards the bar code or the like. The scanner (30) is a CCD or laser scanner.

An antenna (35) is connected to the modular scanner (30) for receiving or transmitting information. An SST radio (36) shown in dashed lines in FIG. 7 can also be used, therewith if desired or if other types of frequencies are desired, they can be used instead.

Figure 13:
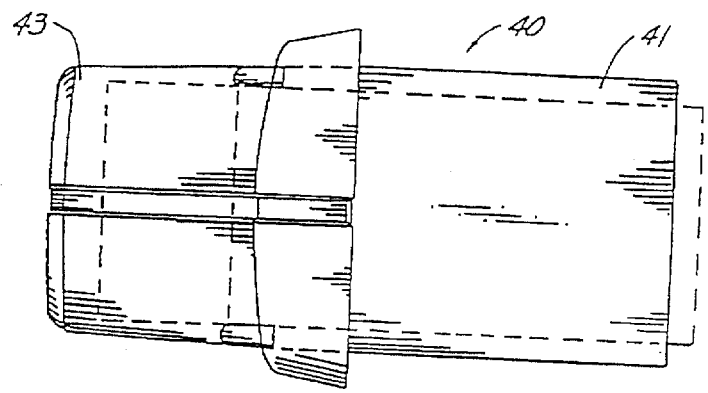
FIG. 13 still another design for a scanner of a modular type which is interchangeable with the top of the hand-held terminal shown in FIG. 1 or with the FIG. 6 credit card reader or the FIG. 10 scanner.
Figure 14:
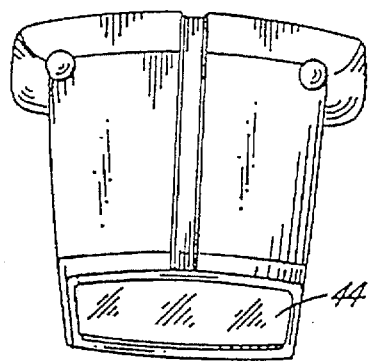
FIG. 14 is a top view of the FIG. 13 scanner.
Figure 15:
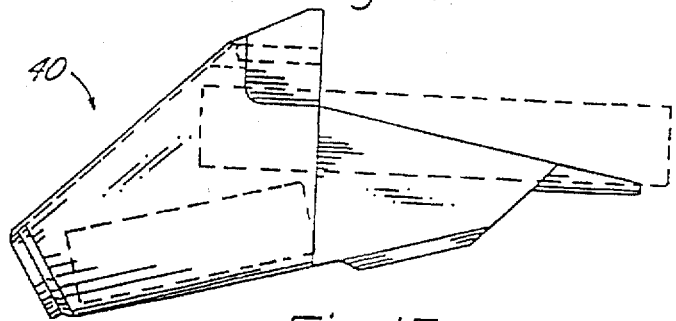
FIG. 15 is a side view of the FIG. 13 scanner.
Figure 16:
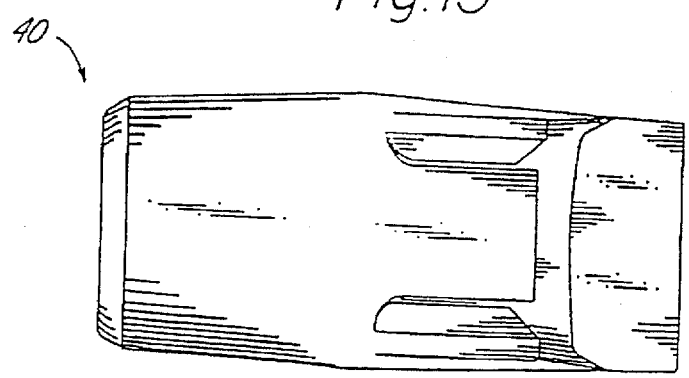
FIG. 16 is a bottom view of the FIG. 13 scanner.

FIG. 13 shows another scanner (40) which can interchangeably be used with the terminal (10) shown in FIG. 1 by sliding portion (41) in the cavity behind display (12) in the housing of the hand-held terminal (10). A top portion (43) of the scanner (40) has a window (44) for emitting signals from a CCD or laser scanner. Scanner (40) has an internal antenna (not shown).

Turning now to embodiments of FIGS. 18—23, FIG. 18 shows a terminal (50) constructed in accordance with the present invention and having a frame (51) with a modular removable keyboard (52), a modular removable central processing unit (53) and interchangeable modular display screens (54), (55), and (56) which can be received into opening (57) in the frame (51).

Referring to FIGS. 18, 19, and 20, it is noted that a frame (58), having an opening (59) therein, permits the display screen (54) to fit into the opening (59) and the screen (54) will plug into connections inside opening (57) of the frame (51). Function buttons (60) on frame portion (58) are useful for various functions and permits the display (54), which can be a liquid crystal display (LCD), t easily and quickly be replaced if desired.

Referring to FIG. 21, it is noted that the display (56), having function buttons (61) thereon, is one example of a modular display unit with function buttons which can be used on the frame (51) by plugging it into the opening (57) in frame (58).

Similarly, FIG. 22 shows a display screen (55) with function buttons (62) thereon which can also be interchanged with the other display modules if this particular configuration of screen and function buttons (62) are desired. The knob (63) can be utilized as desired if a fastener to hold one or both of modules (52) and (53) in place is desired.

Interchangeable CPU modules (53) can also include more or less memory, or different software as required to match to the customers needs and requirements and to match with respective ones of the modular keyboards (52) and modular display (54), (55) or (56).

Referring now to FIGS. 24 and 25, a hand held terminal (70) built in accordance with the present invention is shown with a modular keyboard (72) and a modular display (74). It is noted that the modular keyboard (72) contains both alpha/numeric keys (75) and function keys (76). The function keys (76) are located at the top of the modular keyboard (72) as well as along the sides of the keyboard (72).

The function keys (76) located along the side of the keyboard (72) are positioned such that a user can operate the function keys (76) with the thumb and fingers of the hand used to hold the terminal (70). Grooves (77) positioned along the sides of the hand held terminal (70) assist the user in locating the proper function keys (76) without the need of looking at the terminal (70).

Referring to FIG. 26, an input/output module (78) is shown attached to the bottom of the hand held terminal (70). The input/output module contains two multi-pin jacks (79) which can be used to connect the hand held terminal (70) to a variety of other modules, terminals and computers. It is understood and anticipated that a variety of methods and hardware could be used to accomplish the input/output module connection shown in the present embodiment.

Similar to the hand held terminal (70) shown in FIGS. 24–26, FIGS. 27–34 show hand held terminals (80) with modular keyboards (82), modular displays (84), general alpha/numeric keys (85), function keys (86), and reference grooves (87) in a multitude of different configurations. Obviously, any of these hand held terminals (80) could be used in conjunction with a input/output module, scanner module, magnetic card reader module, or any other compatible module.

Figure 35:
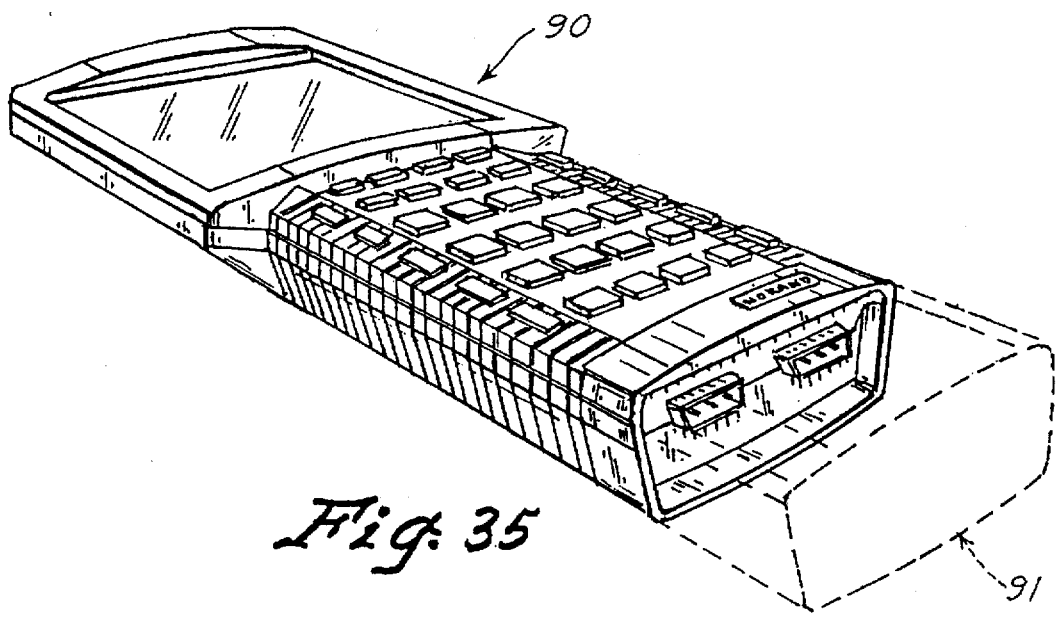
FIG. 35 is a perspective view showing in dashed lines how the terminal can be docked with another module.
Figure 36:
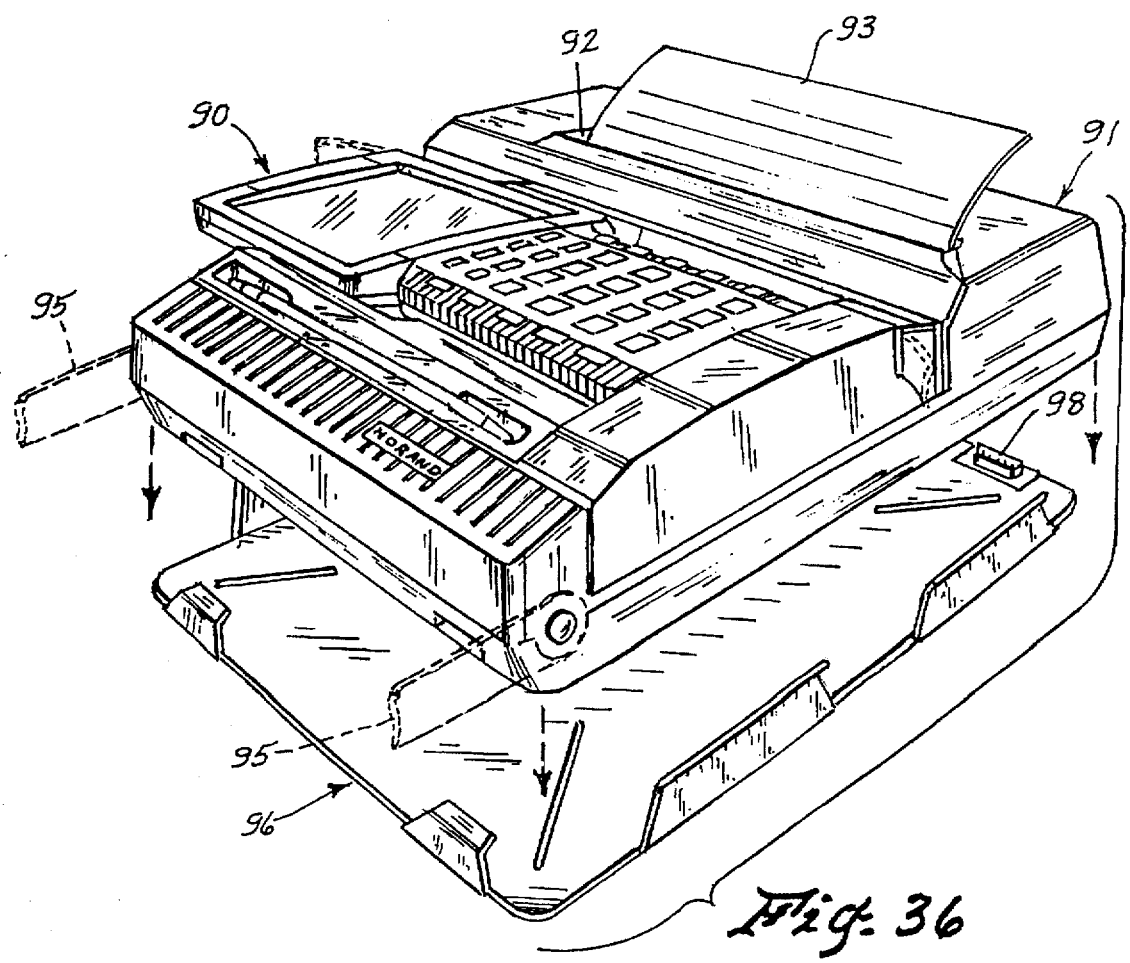
FIG. 36 is a perspective view of the terminal of FIG. 35 docked in a printer module.

FIGS. 35 and 36 show a hand held terminal (90) attached to a printer module (91). The docking portion of the printer module (91) is partially shown in dashed lines in FIG. 35. A paper slot (92) allows paper (93) to feed out of the printer module (91). The paper (93) is stored inside of the printer module (91) and can be of a rolled type or of a fan-fold type.

The printer module (91), hand held terminal (90), and any other desired module, such as a scanner or magnetic card reader (not shown), combine to create a complete, portable and compact computer system. The printer module (91) can have a handle (95) which is partially shown in dashed lines. The handle (95) can be placed in several positions which assist the user both in carrying and in using the printer module (91).

The printer module (91) and the hand held terminal (90) can be connected to a bracket (96). The bracket (96) can be mounted at a work station and can be used to hold the printer module (91) and terminal (90) in place during use. The bracket (96) also contains an electrical interface (98) which can be used to provide power to the printer module (91) or allow data transfers with another computer or storage device while the printer (91) and terminal (90) are docked in the bracket (96). The printer module (91) attaches to the bracket (96) using a tongue and groove biasing design but obviously many variations of fastening methods could be used.

Figure 37:
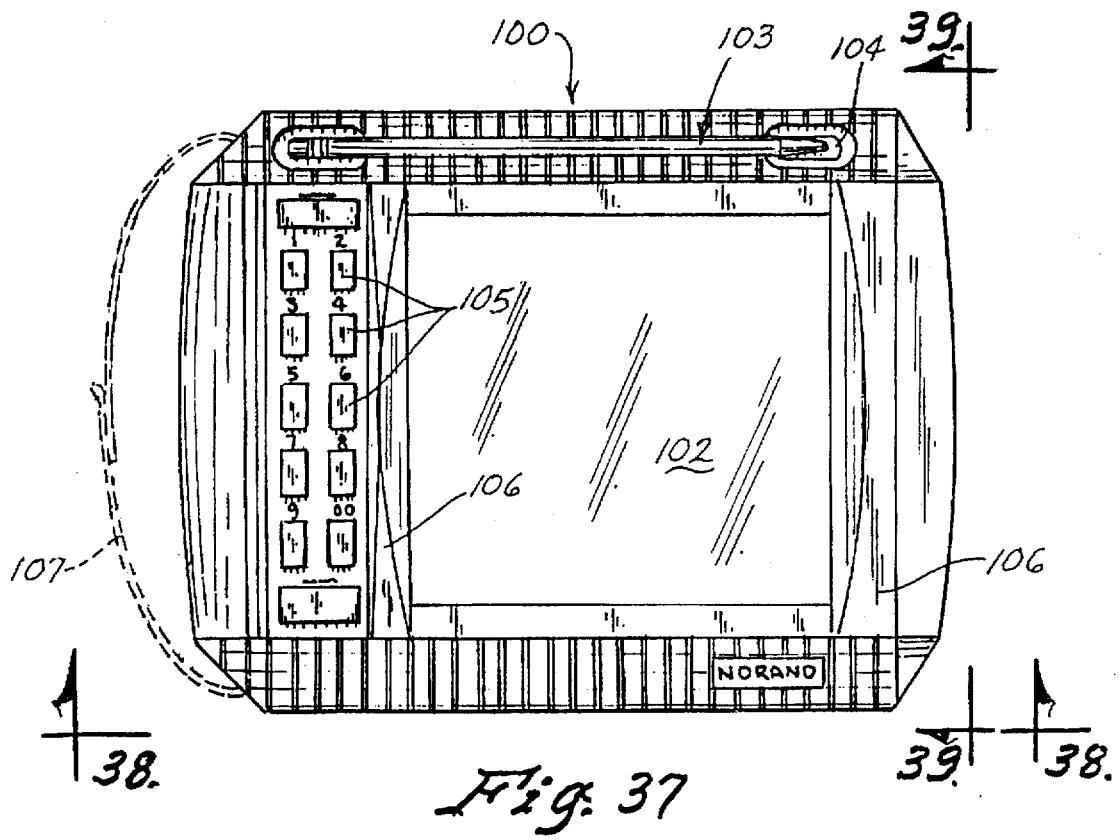
FIG. 37 is a front view of still another hand held terminal containing control/function keys and a larger display screen with which the user can interact.
Figure 38:
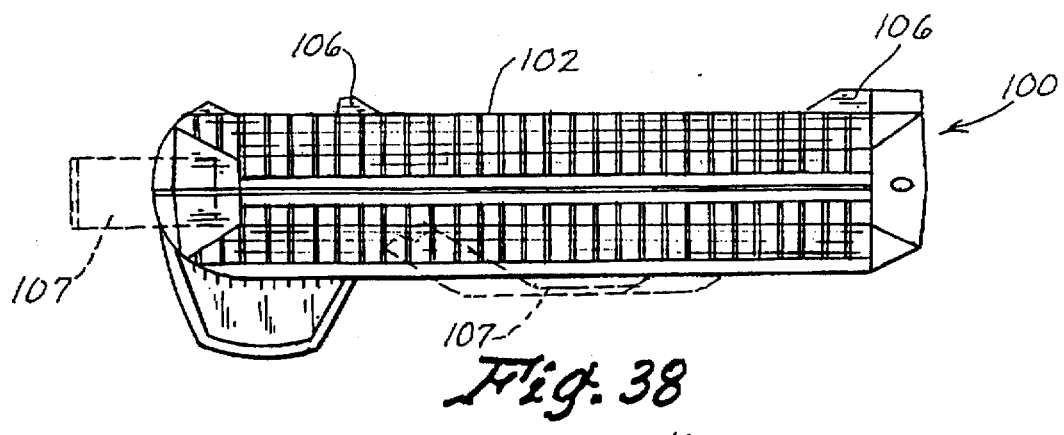
FIG. 38 is a side view taken along line 38—38 of the hand held terminal of FIG. 37.
Figure 39:
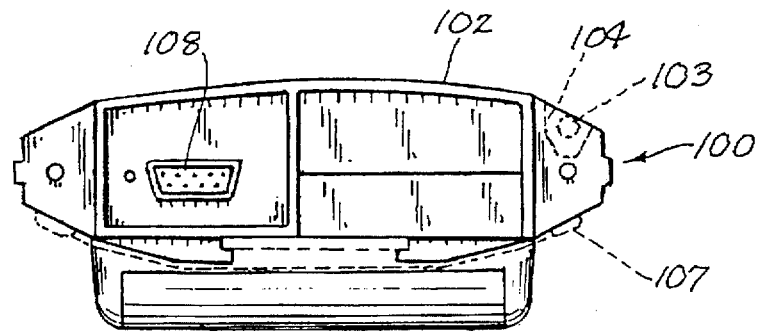
FIG. 39 is a top view taken along line 39—39 of the hand held terminal of FIG. 37.

FIGS. 37, 38 and 39 show another embodiment of a terminal (100) built in accordance with the present invention. The terminal (100) has attached to it a large interactive display screen (102). The display screen module (102) has several input and function buttons (105). The user can interact with the display screen (102) using the built in writing instrument (103). The writing instrument (103) can be used to select various options on the display screen (102) simply by pressing the displayed option. The display screen (102) and writing instrument (103) also can be used as an electronic notebook. The user could simply write a message directly on the screen (102) and the terminal (100) would save the message for later use or recall.

The writing instrument (103) is stored in a slot (104) which is formed into the housing of the display screen (102). The slot (104) is larger on each end which allows the user to easily access the writing instrument (103). The slot (104) is designed such that the writing instrument (103) will remain securely in the slot (104) while not in use.

Figure 40:
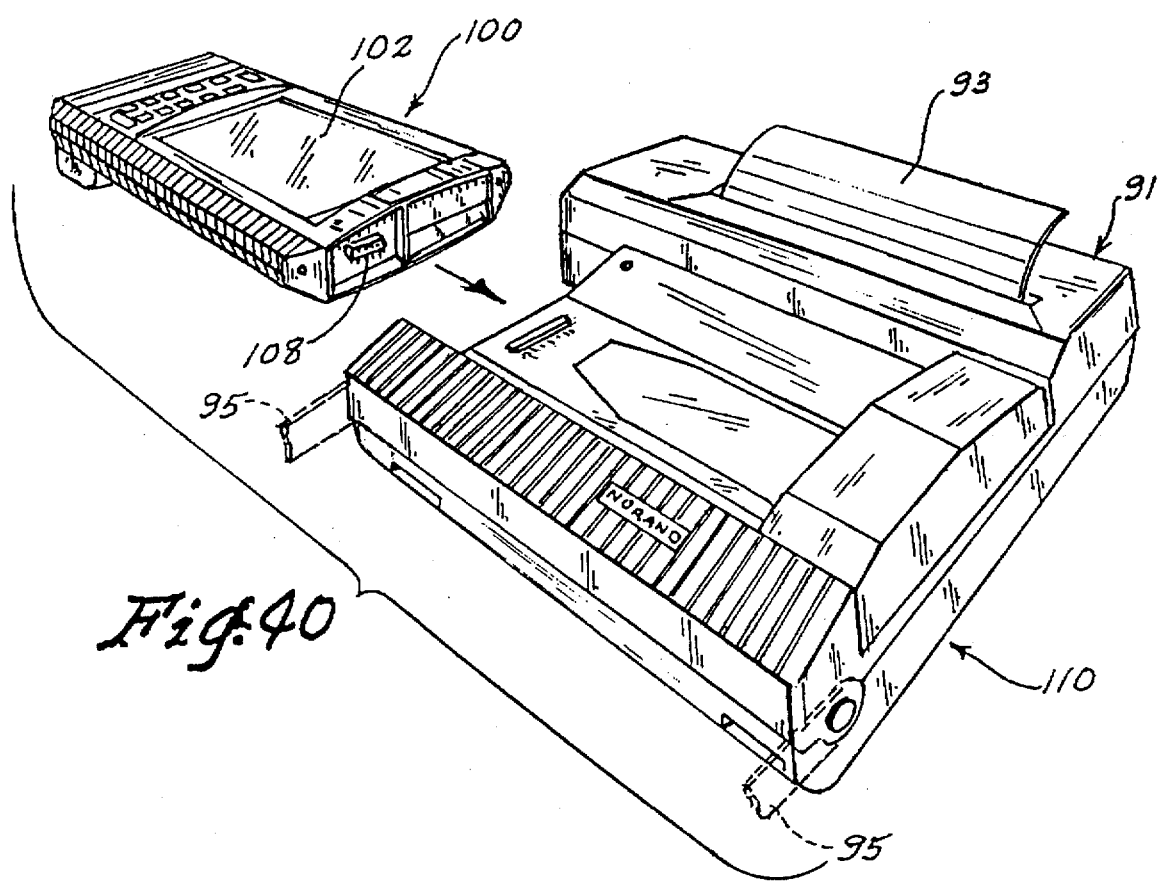
FIG. 40 is a perspective view of the hand held terminal of FIG. 37 which is capable of docking into a printer module such as the module shop in FIG. 36.

A strap (107) is shown in dashed lines. The strap (107) is capable of be placed in a variety of different positions and is used to assist the user while holding, operating and carrying the terminal (100) and display screen (102). The strap could be made in many shapes and out of many different types of material. Also shown on one end of the display screen module (102) is an input/output jack (108). This input/output jack (108) can be used to attach the terminal (100) and display screen (102) to a variety of other compatible modules. The housing of the display screen (102) includes two ridges (106). These ridges (106) help to protect the screen (102) from being damaged during operation. FIG. 40 shows the terminal (100) and the display screen (102) capable of being attached to a modular printer (110).

Referring now to FIGS. 41–46, a hand held terminal (115) is shown with an attached scanner module (116). The hand held terminal (115) is similar the terminals shown in FIGS. 27–34 and includes a display screen (120), general alpha/numeric keys (121), and function keys (122). The scanner module (116) can be used to scan bar codes and is operated using the function key (122) located on the terminal (115).

A strap (125) can be placed on either side of the terminal (115). The strap (125) assists the user in holding and operating the terminal (115) and scanner (116) by making it easier for the user to hold on to the terminal (115). This assistance helps to ease user fatigue while using the scanner (116) and terminal (115). As can be seen in FIG. 41, the strap (125) can be placed on either side to accommodate for user preference and comfort.

A handle (128) is shown in dashed lines in FIGS. 43 and 46. The handle (128) can be used to make the holding and operating of the terminal (115) and scanner (116) easier. The handle (128) is electrically attached to the terminal (115) and a trigger (129) located on the handle (128) can be used to trigger the scanner (116). The terminal (116) also contains two input/output jacks (126) which can be used to attach the terminal (115) to other modules such as a printer module seen in the previously disclosed embodiments.

Referring to FIGS. 45 and 46, the back side of the terminal (115) is show including a removable cover (130) which can be used to gain access to the battery compartment. Also shown is one method of attaching a handle (128) to the terminal (115) which will be discussed in further detail below.

FIGS. 47–50 show a handle (135) capable of being operatively attached to a hand held terminal (136) built in accordance with the present invention. The handle (135) is attached to the terminal (136) using a tongue and groove (139) connection in the forward portion of the handle (136) and to set screws (140) in the rear. A series of electrical contacts (141) allow for signals and power to be sent between the handle (135) and the attached terminal (136). A trigger (142) can be used to activate a selected function of the attached terminal (136). While any function could be activated, it is anticipated that often the trigger (142) will be used to activate a scanner module attached to the terminal (136). It is expected that many methods and variations could be used to operatively attach the handle (136) to the hand held terminal (136).

Figures 47, 48:
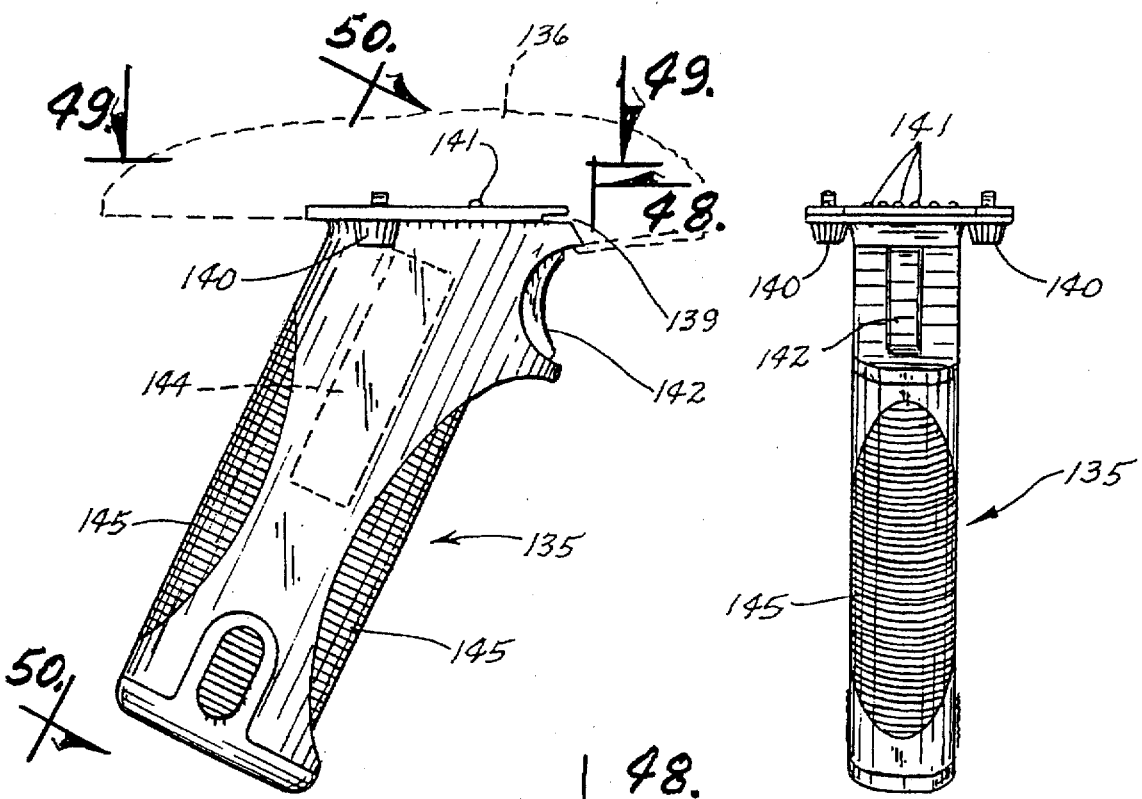
FIG. 47 is a side view of a handle which is attachable to a hand held terminals built in accordance with the present invention.
FIG. 48 front view taken along line 48—48 of the handle of FIG. 47.
Figures 49, 50:
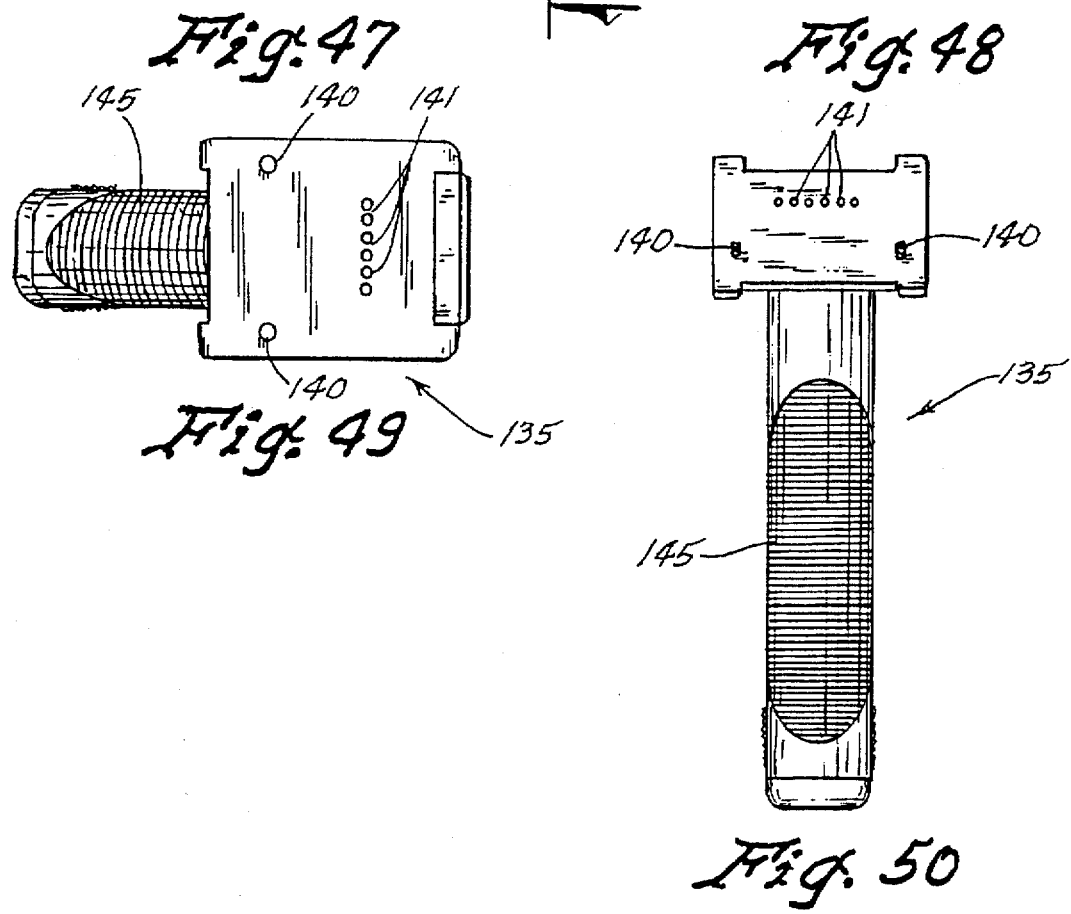
FIG. 49 is a top view taken along line 49—49 of the handle of FIG. 47.
FIG. 50 is a elevational view taken along line 50—50 of the handle of FIG. 47.

A battery compartment (144) is shown in dashed lines in FIG. 47. The battery power can be used to power the terminal (136) or can be used to supplement the power of the terminal (136). The handle (135) can be made of a soft plastic or rubber material and can be molded to include a series of grooves (145). The soft material and the grooves (145) help increase user comfort while using the handle (135) and terminal (136) which in turn reduces user fatigue.

Referring now to FIG. 51–54, a hand-held terminal (150) is shown with a pen based display screen (151) and an attached keyboard module (152). The display screen (151) can be used to read information from the terminal (150) as well as used to enter information directly into the terminal (150). The operator of the terminal (150) can write information which the terminal (150) will store or can respond to prompts from the terminal (150) displayed on the screen (151).

Figure 51:
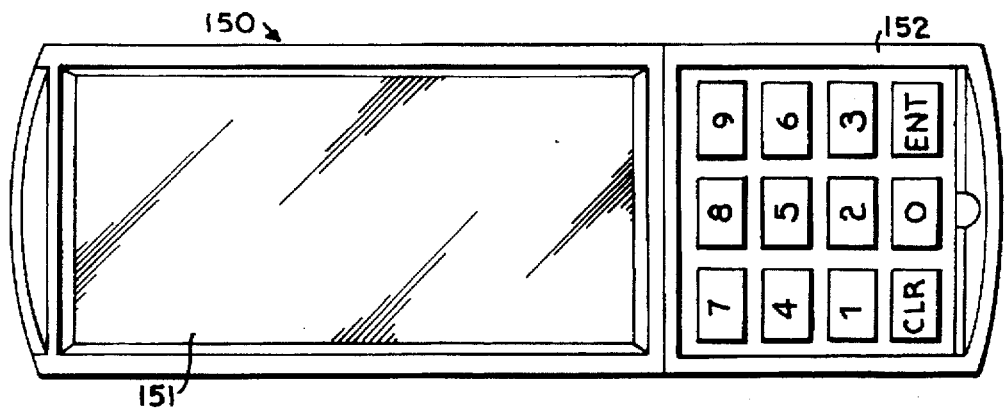
FIG. 51 is a top plan view of another hand-held terminal built in accordance with the present invention.
Figure 52:
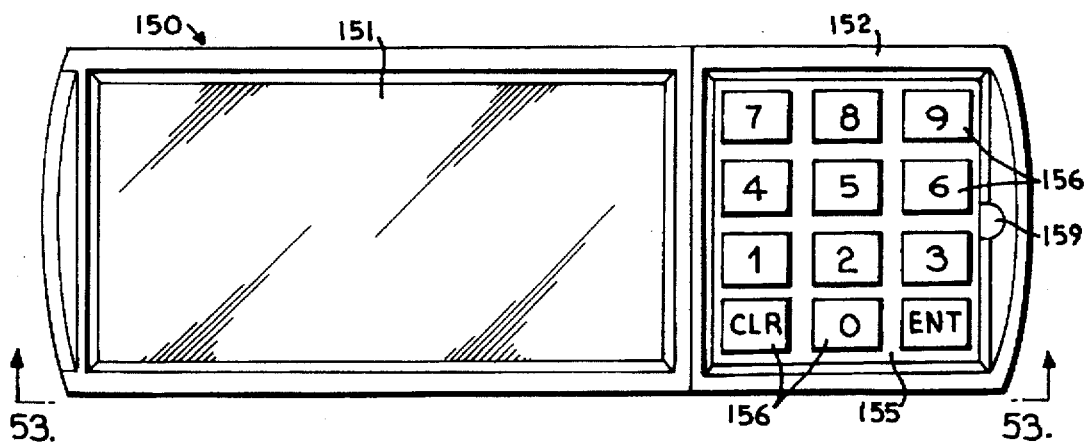
FIG. 52 is a top plan view of the terminal of FIG. 51 showing the keypad in a different configuration.
Figure 53:
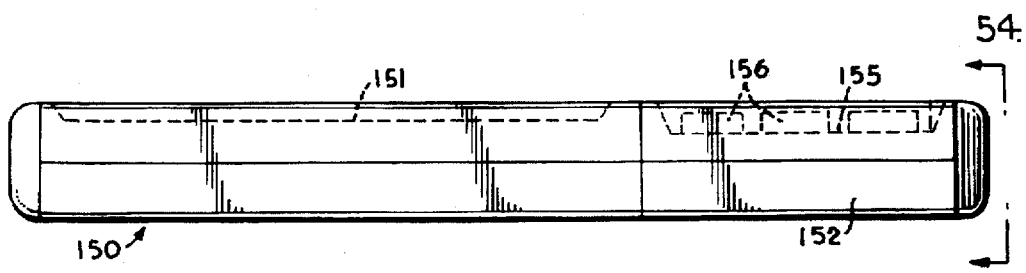
FIG. 53 is a front elevation view taken along line 53—53 of the terminal FIG. 52.
Figure 54:
FIG. 54 is a side elevational view taken along line 54—54 of the hand-held terminal of FIG. 53.

The keyboard module (152) can be attached to the hand-held terminal (150) to allow for rapid information entry. The keyboard module (152) has a keypad (155) with keys (156). The keys (156) in this embodiment represent the 10 numeric values, a clear key, and an enter key. Obviously the keypad (155) could have a fewer or greater number of keys depending on the needs of the user. As can be seen in FIGS. 51 and 52, the keypad can be placed in different positions with respect to the keyboard module (152). This allows the operator to use the hand-held terminal (150) in whatever position is most comfortable. The user can remove the keypad (155) form the keyboard module (152) by inserting a fingernail, a screwdriver or the like in the groove (159) and popping it out. Flexible cabling (not shown) connects the keypad (155) to the keyboard module (152) and allows the operator to select the desired orientation of the keypad (155) and insert it back into the keyboard module (152).

Figure 55:
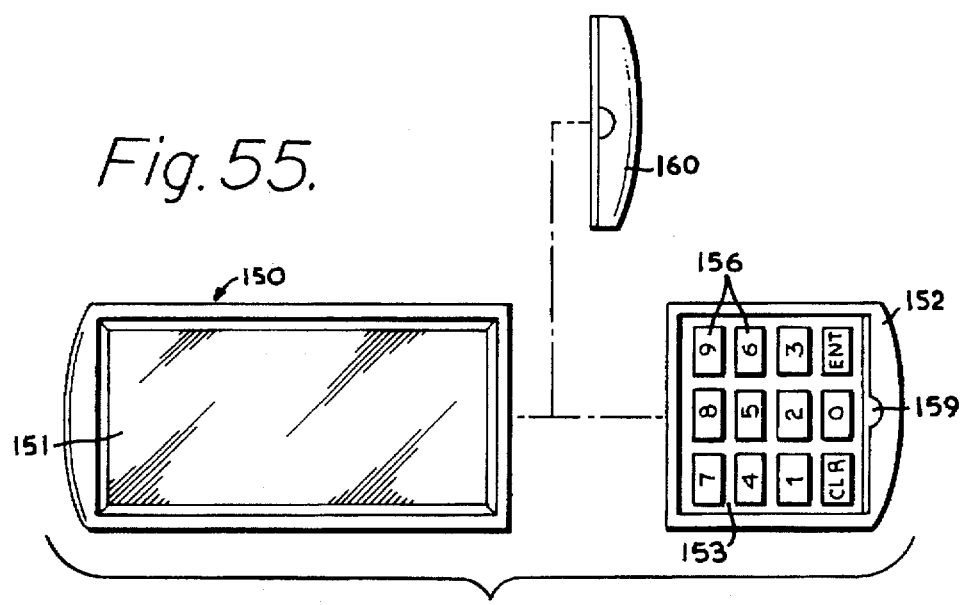
FIG. 55 is an exploded view of the hand-held terminal of FIG. 51.
Figure 56:
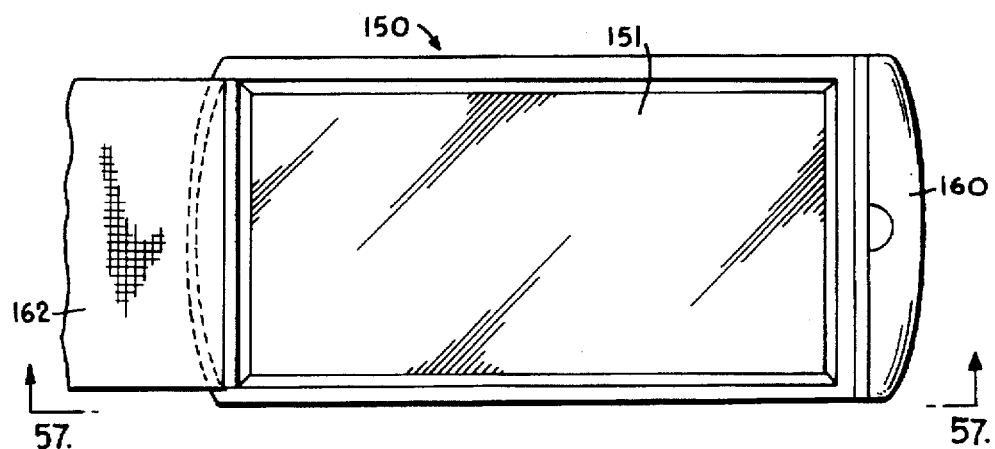
FIG. 56 is a top plan view of a hand-held terminal shown with a strap.
Figure 57:
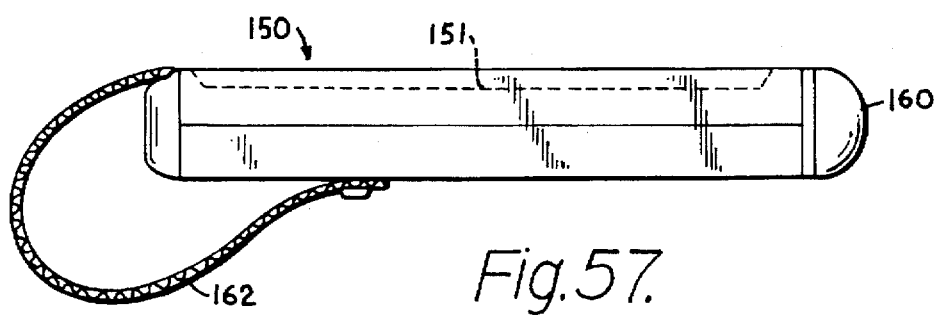
FIG. 57 is a side elevational view taken along line 57—57 of the hand-held terminal of FIG. 56.
Figure 58:
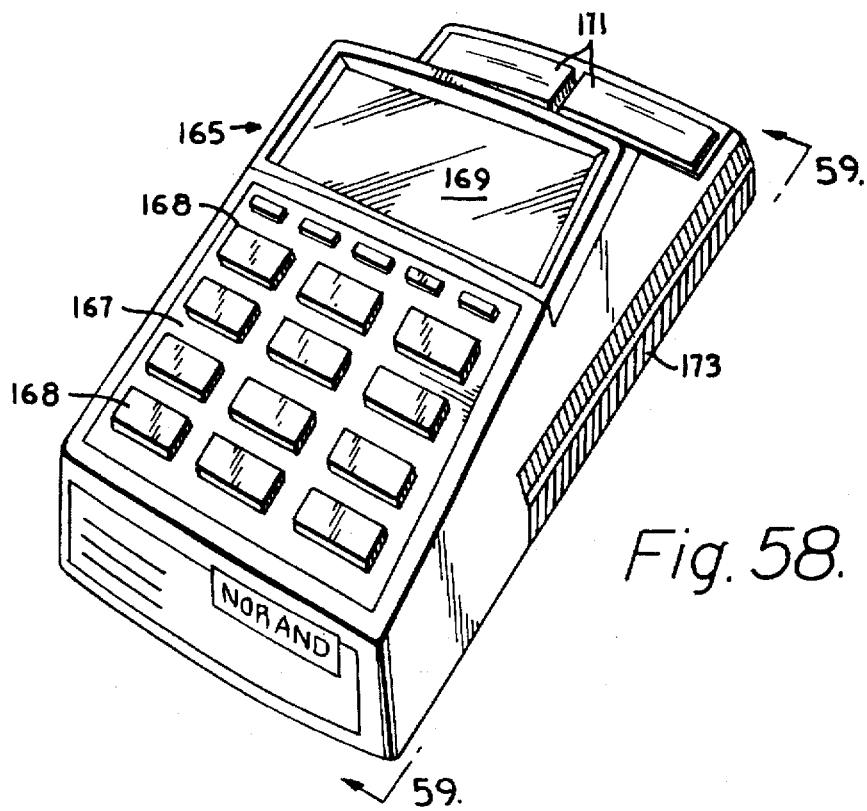
FIG. 58 is a perspective view of still another hand-held terminal built in accordance with the present invention.
Figure 59:
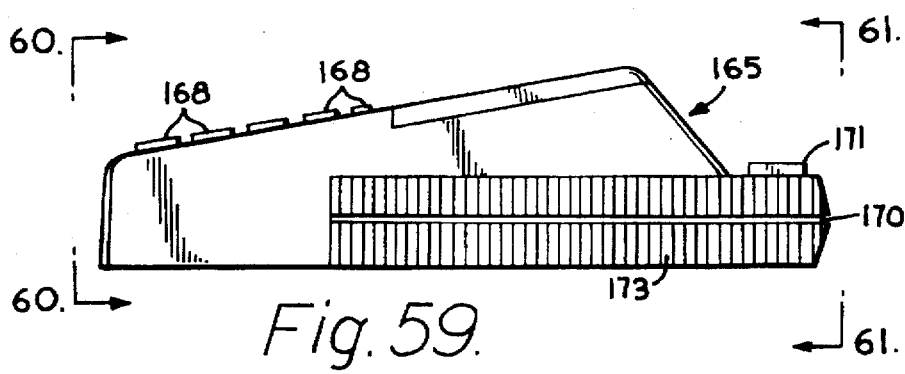
FIG. 59 is a side elevational view taken along line 59—59 of the hand-held terminal of FIG. 58.
Figure 60:
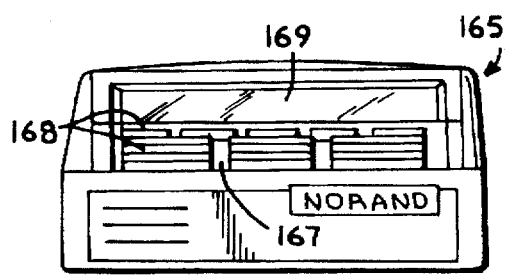
FIG. 60 is front elevational view taken along line 60—60 of the hand-held terminal of FIG. 59.
Figure 61:
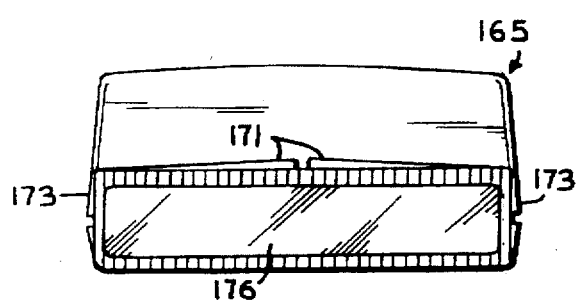
FIG. 61 rear elevational view taken along line 61—61 of hand-held terminal of FIG. 59.

Referring to FIG. 55, the keyboard module (152) can be removed from the hand-held terminal (150). An end cap (160) is placed over the end of the hand-held terminal (150) to protect the electrical connections (not shown) which are used to connect the keyboard module (155). Referring to FIGS. 56 and 57, a flexible strap (162) can be attached to the hand-held terminal (150) to make easier the use by the operator of the hand-held terminal (150).

Referring to FIGS. 58–61, a hand-held terminal (165) is shown which is small enough such that it could be placed in a shirt pocket while not in use. The hand-held terminal (165) has a keypad (167) with alpha/numeric and function keys (168), a display screen (169), a bar code scanner (170), and scanner buttons (171). The hand-held terminal (165) also has ribbed sides (173) which assist the operator in gripping the hand-held terminal (165). The hand-held terminal (165) is small and can therefore be held in the palm of the operator's hand. The operator can use his thumb to operate the scanner (170) by pressing one of the scanner buttons (171). The operator could also use one of the function keys (168) located on the key pad (167) to operate the scanner if desired.

The keyboard (167) and display screen (169) are sloped with respect to the bottom edge of the hand-held terminal (165) to increase the ease of use and visibility of the screen (169) while the user is scanning. Batteries (not shown) are located within the housing of the hand-held terminal (165) and provide the necessary power. A radio transceiver (not shown) can also be placed within the housing of the hand-held terminal (165) to allow for communication with other terminals or a base station.

Referring to FIGS. 62–65, another hand-held terminal (175) is shown which is small enough such that it could be placed in a shirt pocket while not in use. The hand-held terminal (175) shown in this embodiment, however, is one designed to be primarily pen based. The hand-held terminal (175) has an interactive display screen (177) which the operator can use to input information directly into the terminal without the use of keys. A keyboard (178) provides a limited set of keys (179) for information input. The keys (179) could be alpha, numeric, function, or directional. The sides (180) of the hand-held terminal (175) are grooved to assist the operator in gripping the hand-held terminal (175) are grooved to interactive display screen (177) is recessed with respect to the top portion of the hand-held terminal (175) to help protect the screen (177).

Referring now to FIGS. 66–70, a printer module (182) is shown similar to the printer module disclosed above in the discussion of FIGS. 36 and 40. The printer module (182) is capable of receiving hand held terminals (185). The printer module (182) is electrically connected to the hand held terminals (185) and data can be transferred between them. The printer module (182) can be used to print out the information stored in the hand held terminals (185).

The printer module (182) has a paper reservoir (187) which holds paper (188). The paper (188) after being printed upon by the printer module (182) exits the printer module (182) through a slot (189). A magnetic card reader (190) is attached to the printer module (182). Credit cards and the like can be passed through the magnetic card reader (190)

and the information can be stored in one of the terminals, both of the terminals, or printed.

Referring to FIGS. 69 and 70, a cellular phone (191) is shown attached to the printer module (182). Referring to FIG. 71, the printer module (182) and all of the attachments are shown mounted in the cab of a vehicle. The printer module (182) makes all of the modules readily available to a user operating the vehicle.

In reference to FIG. 72, there is shown a pictorial representation of a hand-held terminal (710). The hand-held terminal (710) is shaped similarly to the embodiment of the hand-held terminal (10) which has been described with respect to FIGS. 1–5. Certain changes and modifications and added features which may be found in the embodiment of the hand-held terminal (710) the already described embodiment shown in FIGS. 1–5 follow. A keyboard (711) includes in the embodiment of FIG. 72 a key array (712) of assigned key functions for each of the key positions in the keyboard (711). Special function keys may have specially configured keys, such as left and right cursor keys (713 and 714) and up and down cursor keys (715 and 716). Advantageously, the cursor keys (713 through 716) are disposed in an upper portion of the key array (712) adjacent an LCD screen (717). The LCD screen (717) is preferably a dot-addressable screen which may be used in a graphics mode as well as in a text mode. In addition, a screen display size for the text mode of the LCD screen may be selected while the hand-held terminal (710) is in a setup mode. The selection of the display size is preferably software-controlled. User friendliness of the hand-held terminal (710) is advanced by a capability of similarly selecting individual functions of the keys in the key array (712). A keyboard overlay (718) may be provided showing indicia which labels key positions to correspond to assigned key functions for each key position of a selected key array (712).

A feature shown in the above-described embodiments of the invention, and also found in the embodiment of the hand-held terminal (710) is co-molded shock absorbing material (722) which is shaped in strategic border areas about the screen (717). The hand-held terminal (710) has a housing (723) which is molded preferably of high impact-resisting, commercially available plastic material. Such impact-resisting material may protect the housing (723) from being damaged in a standard fall (a four-foot fall to a concrete surface). However, a co-molded rubber compound is applied about the periphery of the housing (717) to absorb and soften sudden impact energy spikes, to thereby protect also electronic components contained within the housing (717) of the hand-held terminal (710). In addition, the co-molded rubber compound is uniquely shaped in a region about the screen (717). The unique shaping serves to maintain an ornamental appearance of the hand-held terminal (10) as shown in FIG. 1, for example. In addition, functional advantages may be derived by spaced, raised ribs (724) of co-molded rubber without changing the ornamental appearance of the co-molded rubber in the region of the screen (717). The raised ribs (724) would be initially contacted on impact if the hand-held terminal (710) falls to the ground, screen first. Though the ribs (724) may be of the same material as underlying co-molded resilient material, because of a smaller impact area of the ribs, initial compression is locally greater. The local, increased compressibility appears to result in a more gradual deceleration before the fall is arrested. Consequently, peak impact energy is reduced by becoming distributed over a greater distance of compression, or over a longer time interval after initial impact of the hand-held terminal (710) with the ground. A preferred width of each of the ribs (724) is, as an example, 0.060 inch or about 1/16 of an inch and a preferred height is a nominal 1/32 or 0.30 inch. A preferred pitch or spacing between adjacent ribs (724) is, correspondingly, approximately 7/32 of an inch or a nominal 0.214 inch.

The hand-held terminal (710) further features an integrated scanner-radio module (725) which features a self-contained antenna (726) formed within the housing, (728) of the scanner-radio module (725). In a particular embodiment, the antenna (726) may be formed about a scanning window of the scanner-radio module (725). The scanner-radio module (725) is removably attached to the hand-held terminal (710), and may be replaced by other function modules, such as the credit card reader (20) described with respect to FIGS. 6–8, or the scanner (30) depicted in FIG. 9, for example. A feature of the hand-held terminal (710) is an interchangeability of various function modules which may be used with compatible hand-held terminals including the hand-held terminal (10).

FIG. 73 shows a side elevation of the hand-held terminal (710), described with respect to FIG. 72, in combination with a handle (730), which may also be referred to as a pistol grip handle (730). In particular, the hand-held terminal (710) is shown in an exploded, or side-by-side, view with the pistol grip handle (730), highlighting features of both the hand-held terminal (710) and the pistol grip handle (730). The side elevation of the hand-held terminal (710) shows the housing (728) as consisting of an upper housing shell (731) and a lower housing shell (732). The upper housing shell (731) features access to the described keyboard (711) and screen (717). The lower housing shell (732) is of a grip-conforming, rounded cross-sectional shape which transitions in a region adjacent and below the screen (717) into the shape of received function modules. A representative transition in the shape from the lower housing shell (732) to the scanner-radio module (725) is best illustrated in the pictorial drawing of the hand-held terminal (710) in FIG. 72. Referring again to FIG. 73, a hand-strap (733) of resilient material is attached one end to the lower housing shell (732) adjacent a lower end cap (734) of the hand-held terminal (710). The hand-strap (733) spans longitudinally the underside of the hand-held terminal (710), being attached at an opposite end to the function module, such as the scanner-radio module (725). The hand-strap (733) is intended to minimize a risk of an operator accidentally dropping the hand-held terminal (710), and eliminates a need for an operator of the hand-held terminal (710) to maintain an ever-vigilant grip on the hand-held terminal (710).

The pistol grip handle (730), according to the present embodiment of the invention, features an upper receptacle portion in a cross-sectional shape of a channel (735), and a lower support base (736) from which extends a grip portion or grip (737). The pistol grip handle (730) may simply be slipped over the lower end cap (734) onto the adjacent elongate portion of the housing (728), the direction being indicated by arrow (738). Upon full engagement of the pistol grip handle (730) with the hand-held terminal (710), a detent (739) of a latch lever (740) engages and seats itself against an upper end (741) of the docking contacts (13) of the hand-held terminal (710), thereby latching the pistol grip handle (730) onto the hand-held terminal (710).

FIG. 74 is a bottom view of the pistol grip handle (730) viewed in the direction "74—74", as shown in FIG. 73 The pistol grip handle (730) is shown as preferably being molded as first and second halves (742 and 743), the two halves of the pistol grip handle being substantially mirror images of each other. A release gripper recess (744) is formed in the lower support base (736) of the pistol grip handle (730). The release gripper recess is a cavity or indentation which is molded at a preferred distance of approximately two inches forward of the latch lever (740). When an inserted and latched hand-held terminal (710) is to be released and separated from the pistol grip handle (730), an operators index finger may be inserted into the release gripper recess (744) while the operator's thumb depresses the latch lever (740) to disengage the hand-held terminal (710) from the pistol grip handle (730). In this manner one hand supports and holds the pistol grip handle (730), while the operator's other hand pulls on and removes the hand-held terminal (710). The gripper recess has been found to be a solution to a convenient two handed separation of the hand-held terminal (710) from the pistol grip handle (730). The very bottom of the grip portion (737) shows a molded recess and pin combination (745) by which a carrying strap may conveniently be attached.

In reference to FIGS. 73 and 75, an end view of the pistol grip handle (730) viewed in the direction of "75—75" shows a trigger (746) centrally mounted within the grip (737). The trigger (746) is pin-mounted within the grip and is spring-biased outward from the grip (737). A squeezing of the trigger (746) causes an inner end (747) of the trigger to pivot upward in the direction of arrow (748) into the channel (735) which is occupied by the hand-held terminal (710) upon its insertion into the pistol grip handle (730). The upward pivot position of the inner end (747) is shown in phantom lines in FIG. 75. A permanent bar magnet (749) is mounted to the inner end (747) of the trigger (746). The bar magnet (749) when moved upward becomes disposed adjacent a magnetic reed relay (750) which is disposed within the scanner-radio module (725) of the hand-held terminal (710). Thus, upon activation of the trigger (746), the reed relay activates a scanner of the scanner-radio module (725). The trigger (746) of the pistol grip handle (730) is but one of a number of scanner activators which are available to an operator of the hand-held terminal (710). FIG. 72 shows in the key array (712) an elongate key (751) disposed centrally and next to the screen (717). A further scanning trigger mechanism is found in left- and right-hand, laterally disposed scanner switches (752), only the right-hand one of which being shown in the side elevation of the hand-held terminal (710) of FIG. 72. Depending of whether a right or left handed operator uses the hand-held terminal (710), either one or the other of the two scanner switches (752) may be depressed, the operation and the functional result of a scanner activation being identical for either of the scanner switches (752). The various scanner activators made available have been found to increase the user friendliness of the hand-held terminal (710). This is found to be particularly important, since code scanning appears to be a convenient manner for collecting data in almost any conceivable operating environment for the hand-held terminal (710).

FIG. 76 is a schematic diagram of a battery charging circuit (755) of the hand-held terminal (710). An unregulated 12 volt power source may be coupled through a charge terminal (756) into the hand-held terminal (710) for power recharging purposes and to provide external power during that time. Current-outflow protection during periods of external power failure or shut-off may be provided, as shown, via a Schottky diode (757). Voltage adaptation to desired system voltages may be provided, as shown, for example, by an N-channel FET circuit (758) to provide conveniently a 3-volt potential drop. The FET circuit (758) may include more than one FET device coupled in parallel to handle normal power loads. A 12-volt Zener diode (759) may conveniently be provided to clip unexpected overvoltage before the unregulated source is applied to drive system power "B+" as shown at (760).

As will be understood from the following, the battery charging circuit (755) is capable of providing in a preferred charging mode a battery charging current at a constant current level to a battery to be charged. Desirably, a commercially available switching power supply could offer cost savings and provide a space-saving, compact internal power supply for the hand-held terminal (710). However, readily available "on-board" compact power supplies are typically regulated voltage, switching power supplies. Such a fixed voltage or regulated voltage power supply may be adapted in accordance herewith to serve advantageously as a battery charging element.

A regulated voltage, switching power supply "SWITCHING POWER SUPPLY" (761) typically operates in a feedback mode, wherein the power supply (761) monitors whether an output voltage resulting from its power output to a load circuit corresponds to a predetermined voltage level. The power supply (761) then provides sufficient power to the load circuit to maintain the predetermined voltage level at a monitored control or output voltage terminal. The regulated voltage power supply (761) of the preferred embodiment is a 5-volt switching power supply marketed under the designation "MAX 738" by Maxim Integrated Products, Sunnyvale, Calif. The voltage regulation provided by the power supply (761), however, fails to provide a control of an external power source to provide a battery charging current of a predetermined current charging profile to a battery. In accordance herewith, the feedback voltage to be monitored by the power supply (761) is intercepted by a control circuit (762), particularly a comparator circuit "COMP W/ OFFSET" (762), and is altered in a controlled manner to cause the constant voltage power supply to become a controlled, and particularly a constant, current source. An offset voltage used by the comparator circuit is preferably chosen to vary the feedback voltage to be monitored by the power supply (761) about a threshold voltage which corresponds to the voltage level controlled by the power supply (761). A reference voltage chosen for the offset would therefore ideally be one supplied by the power supply (761). As the above functional description of the battery charging circuit (755) shows, commercially available constant voltage power supplies may be used in accordance herewith in a broad range of uses as controlled current sources, and particularly as battery charging circuits.

The preferred regulated voltage power supply (761) provides as one of its output signals a reference voltage signal of 1.23 volts. In an embodiment of the battery charging circuit (755) shown in FIG. 76, the reference voltage is conveniently applied to the comparator circuit "COMP W/OFFSET" (762) via voltage line (763) and through a voltage multiplier to be used for a voltage offset by the comparator circuit (762). The voltage multiplier circuit raises the reference voltage to the desired offset bias voltage, assuring a positive voltage signal at the "sense" terminal of the voltage comparator circuit (762). The comparator circuit (762) compares a "sense" voltage to a "set" voltage at respective "sense" and "set" terminals. If the "sense" voltage deviates with respect to the "set" voltage by being either greater or less than the "set" voltage, the Comparator circuit (762), increases or decreases the control voltage "CV" correspondingly above or below the output voltage expected by the regulated voltage power supply (761). The change in the control voltage CV is applied to control the regulated voltage power supply (761) to correspondingly decrease or increase its power output until the "sense" voltage is adjusted (lowered or raised) to the voltage level of the "set" voltage. In the described embodiment, a control voltage line "CV" (764) is coupled to apply the control voltage signal CV of the comparator circuit (762) to the power supply (761). Under normal operation of the regulated voltage power supply (761) the control voltage CV would be a feedback signal, the magnitude of which would be directly controlled by the power output of the power supply (761). According to the present operation, however, the comparator circuit (762) controllably varies the control voltage CV according to changes in current flow between a system ground (765), a negative battery terminal "BN" (766) of a battery to be charged (767) and a positive battery terminal "BP" (768). The battery (767) is coupled between the negative battery terminal (766) and the positive battery terminal "BP" (768). In a preferred embodiment, a nominal battery voltage is 7.2 volts. Current flow through the battery (767) would therefore be determinable as a voltage change at the negative battery terminal (766), as may be measured across a reference resistor with respect to the system ground (765).

Control over the power supply (761) is exercised by a pulsed control input signal "CHG" (769). The CHG input signal (769) is in the preferred embodiment a five-volt signal which is controllably switched between the five-volt high and system ground. The frequency and pulsewidth of the signal are the two variables which determine a current level to be supplied by the power supply (761). A microprocessor control may be used to set or vary the pulsewidth and thereby the output current. For a constant current control, the pulsed control signal operates at a set frequency and has a predetermined pulsewidth. The signal pulses pass through an RC circuit (770) which converts the pulsed input signal to a DC reference voltage. The pulsewidth of the pulses or duty cycle of the pulsed signal determines the voltage level of a "set" voltage input to the comparator circuit (762). It should be understood that a predetermined constant pulsewidth of the input signal according to the present embodiment could readily be changed to a programmably varied pulsewidth in accordance with established techniques. For example, a programmable counter may be set to a different count to change the duty cycle of the pulsed signal.

The switching power supply (761) has an power output terminal (771) which provides through a continuously switched supply signal into an LC power circuit a controlled power output to maintain the control voltage CV applied through the line (764) constant at a predetermined voltage level (which is in the preferred embodiment 5 volts). The switched power output applied to the LC power circuit is an average of a continuously switched power signal. Thus, according to the presently described power supply, a maximum power which may be supplied corresponds essentially to the maximum possible input power. An on-cycle of the switched power supply is in such case essentially 100 percent. On the other hand, when the power is to be reduced according to a limited need by a load which may be coupled to the output terminal (771), the duty cycle of the switched signal may decrease toward a zero percent duty cycle. As the monitored voltage at the CV line (764) decreases, the power supply would again increase the duty cycle of the switched signal to maintain the monitored voltage constant. However, the comparator circuit (762) is coupled to control the voltage on the CV line (764). The comparator circuit, cooperatively intervenes to change the voltage on the control voltage line (764) in response to sensed current flow through the battery (767). Consequently, the power applied via the power output terminal (771) no longer results in a controlled voltage output, but instead causes a current flow of predetermined current magnitude profile through the battery (767). In the present embodiment, the current flow is desirably a constant current flow having a constant ampere value applied to the battery (767), as controlled by the constant pulsewidth of the pulsed signal applied at the "CHG" terminal (769). The preferred current flow is determined by the size of the battery storage capacity in ampere hours. One-half of the capacity of the battery (767) is a preferred charging rate for a fast charge on the battery.

The magnitude of a charging, or discharging, current through the battery (767) is measured across a reference resistor (772) which is coupled for that purpose between system ground (765) and the negative battery terminal (766). As will be understood by those skilled in the art, the reference resistor (772) is a preferably of a low resistance (0.1 ohm, 1 percent precision). In accordance herewith, all resistor values of the described battery charging circuit (755) have been selected with one percent tolerance precision. Because of the comparatively low voltage swing over the control range of the battery charging circuit (755), a diode clipping circuit (773) of two parallel-coupled, oppositely-facing Schottky diodes (774) may bridge the reference resistor (772), paralleled by a typical noise protecting capacitor, to allow for current passage through the battery (767) beyond the control range of the battery charging circuit (755). Input impedances (775) and (776) to the "sense" terminal (777) and to the "set" terminal (778), respectively, are preferably of 1K ohm each. The RC circuit (770) employs preferably a 20K resistor (781) which is coupled through a 0.1 microfarad capacitor (782) to system ground, and through a 27.4K ohm resistor (783) as an input impedance to the "set" terminal (778) of the comparator circuit (762). In a preferred embodiment, the comparator circuit (762) may include in essence two amplifier circuits, a voltage multiplier circuit (885) and a comparator amplifier circuit (886). The voltage multiplier circuit (885) receives the 1.23 volt reference signal from the power supply (761) at the positive input. The feedback loop to the negative input includes a first voltage divider resistor (887) of 309K ohms, with a second voltage-divider resistor (888) of 43.2K ohms coupled from the negative input to ground. The resulting output voltage of the voltage multiplier amplifier circuit (885) would consequently be essentially 10 volts, which is applied through a 20K ohm resistor (889) to the positive input of the comparator amplifier circuit (886). The positive input of the comparator amplifier circuit (886) corresponds also to the "sense" terminal of the overall comparator circuit (762). The negative input of the comparator amplifier circuit (886) is coupled through a 10K ohm resistor (890) as a feedback resistor to its output terminal which corresponds to the control voltage line "CV" (764). Several capacitor elements are shown to identify points at which filter capacitors are used to smooth ripples or spikes. It should be noted that any specifications for these capacitors may vary depending on the type of switching power supply which may be used or the type of ESD protection which may otherwise be used or needed.

A convenient shut-off switch (891) disconnects the battery (767) whenever an external power source is connected to the hand-held terminal (710). The switch (891) provides a turn-off signal at a gate terminal (892) of a P-channel FET (893) to switch off the positive battery terminal (768) from the positive system power terminal (760). The battery (767) remains switched off while external power remains connected to the hand-held terminal (710). Battery power would be restored upon removal of external power by initially supplying power to the "B+" port (760) through a Schottky diode (894). Restored system power would then provide a turn-on signal at the gate terminal (892) to provide a low loss pass for battery current to power the system. It is to be understood that specific values of the described electronic components are recited for a better understanding of the described subject matter and are not to be considered limiting to the scope of the invention. The described battery charging circuit (755) may be used in various other, controlled current applications. Also, as has been found in practice, battery charging operations are known to be affected by battery temperatures. Overcharging of rechargeable batteries may result in increases in battery temperatures. It may be desirable to use the presently disclosed battery charging circuit with known temperature monitoring probes and safety circuits which prevent charging of the battery whenever the battery temperature is such that the battery cannot be charged, or whenever an increase in a monitored battery temperature with respect to the environment indicates that the battery is fully charged. The battery charging circuit may then be switched off or otherwise the external power source may be removed from the circuit. In view of the above description, various changes and other modifications within the scope and spirit of the invention may come to mind.

As used in the manner described, the battery charging circuit (755) may advantageously be provided in a compact circuit arrangement in which the comparator circuit (762) takes control of the power output of the regulated voltage power supply (761) and cooperatively interacts with the power supply (761). The cooperative interaction of the comparator circuit (762) with the power supply changes the function of the power supply (761) from a controlled voltage source to a controlled or constant current source.

Accordingly, it will be appreciated that the preferred embodiment and modifications thereof as disclosed herein do indeed accomplish the aforementioned objects. Obviously, many modifications and variations of the present invention are possible in light of the above teachings. It is therefore to be understood that, within the scope of the appended claims, the invention may be practiced otherwise than as specifically described.

We claim:

1. Apparatus comprising:

hand-held body means for receiving, storing and transmitting information, said hand-held body means having a top portion, a bottom portion, a forward end, a rear end and a longitudinal axis;

key means disposed in said top portion for manually entering information into said body means;

display means disposed in said top portion for displaying information;

battery means disposed within said hand-held body means for providing electrical power thereto;

low power radio frequency transceiver means disposed at least partially in said hand-held body means for receiving and transmitting information between said hand-held body means and a base radio transceiver;

magnetic reader means operatively attached to said hand-held body means for reading the magnetic stripe from credit cards, wherein said magnetic reader means is configured as a module that is readily physically and communicably removable from and re-insertable into said hand-held body means; and scanning means for optically reading information transmitting such information to said hand-held means wherein said scanning means is configured as a second module that is readily physically and communicably removable from and reinsertable into said hand-held body means to replace said first module; and wherein each of said magnetic reader means and said scanning means can be interchanged with the other.

2. The apparatus of claim 1, wherein said low power radio frequency transceiver means is a part of said second module.

3. The apparatus of claim 2, wherein said low power radio frequency transceiver means includes an antenna.

4. The apparatus of claim 1, wherein each of said first module and said second module includes one of said low power radio frequency transceivers.

5. The apparatus of claim 1, wherein said scanning means is configured to operatively read bar codes.

6. The apparatus of claim 1, wherein said forward end of said hand-held body means has a cavity configured to receive a selected one of said first module and said second module therein.

7. The apparatus of claim 1, wherein said scanning means includes a laser scanner.

8. The apparatus of claim 1, wherein said scanning means includes a CCD scanner.

9. The apparatus of claim 1, wherein said scanning means is operable by said key means.

10. The apparatus of claim 1, wherein said low power radio frequency transceiver means is a part of said first module.

11. The apparatus of claim 10, wherein said low power radio frequency transceiver means includes an antenna.

12. The apparatus of claim 1, wherein said hand-held body means is configured to fit in a user's shirt pocket.

13. The apparatus of claim 1, wherein said low power radio frequency transceiver receives and transmits in a spread spectrum range.

14. The apparatus of claim 1, wherein said low power radio frequency transceiver means is operable by said key means.

15. Apparatus comprising:

hand-held body means for receiving, storing and transmitting information, said hand-held body means having a top portion, a bottom portion, a forward end, a rear end and a longitudinal axis;

means for entry of information into said body means by user;

display means disposed in said top portion for displaying information;

battery means disposed within said hand-held body means for providing electrical power thereto;

communication means disposed at least partially in said hand-held body means for receiving and dispersing information between said hand-held body means and a remote communication device;

magnetic reader means operatively attached to said hand-held body means for reading the magnetic stripe from credit cards, wherein said magnetic reader means is configured as a module that is readily physically and communicably removable from and re-insertable into said hand-held body means; and scanning means for optically reading information and transmitting information to said hand-held body means wherein said scanning means is configured as a second module that is readily physically and communicably removable from and re-insertable into said hand-held body means; and wherein each of said magnetic reader means and said scanning means is removable and replaceable by the other.

* * * * *